US010778969B2

(12) United States Patent
Sugio et al.

(10) Patent No.: US 10,778,969 B2
(45) Date of Patent: Sep. 15, 2020

(54) IMAGE CODING METHOD AND IMAGE DECODING METHOD

(75) Inventors: Toshiyasu Sugio, Osaka (JP); Takahiro Nishi, Nara (JP); Youji Shibahara, Osaka (JP); Hisao Sasai, Osaka (JP)

(73) Assignee: SUN PATENT TRUST, New York, NY (US)

( * ) Notice: Subject to any disclaimer, the term of this patent is extended or adjusted under 35 U.S.C. 154(b) by 263 days.

(21) Appl. No.: 13/993,230

(22) PCT Filed: Dec. 14, 2011

(86) PCT No.: PCT/JP2011/007002
§ 371 (c)(1),
(2), (4) Date: Jun. 11, 2013

(87) PCT Pub. No.: WO2012/081246
PCT Pub. Date: Jun. 21, 2012

(65) Prior Publication Data
US 2013/0266069 A1 Oct. 10, 2013

Related U.S. Application Data

(60) Provisional application No. 61/424,086, filed on Dec. 17, 2010.

(51) Int. Cl.
*H04N 19/109* (2014.01)
*H04N 19/176* (2014.01)
(Continued)

(52) U.S. Cl.
CPC ......... *H04N 19/109* (2014.11); *H04N 19/147* (2014.11); *H04N 19/176* (2014.11);
(Continued)

(58) Field of Classification Search
CPC .......... H04N 19/00721; H04N 19/103; H04N 19/105; H04N 19/114; H04N 19/573; H04N 19/51; H04N 19/503; H04N 19/50
(Continued)

(56) References Cited

U.S. PATENT DOCUMENTS

| | | | | |
|---|---|---|---|---|
| 5,737,019 A | * | 4/1998 | Kim | ............. G06T 3/4084 375/240.25 |
| 6,493,385 B1 | | 12/2002 | Sekiguchi et al. | |

(Continued)

FOREIGN PATENT DOCUMENTS

| | | |
|---|---|---|
| JP | 2004-23458 | 1/2004 |
| JP | 2004-32355 | 1/2004 |

(Continued)

OTHER PUBLICATIONS

"Advanced video coding for generic audiovisual services", ITU-T Recommendation H. 264, Mar. 2010.
(Continued)

*Primary Examiner* — Joseph G Ustaris
*Assistant Examiner* — Jimmy S Lee
(74) *Attorney, Agent, or Firm* — Wenderoth, Lind & Ponack, L.L.P.

(57) ABSTRACT

An image coding method for coding a current block, by assigning two or more reference picture indexes to one or more reference pictures that are different from a current picture which includes the current block, and the image coding method comprises the following when the two or more reference picture indexes are used to code the current block: determining whether or not reference pictures identified by two or more reference picture indexes are identical to each other; and switching, based on a result of the
(Continued)

determining, between whether or not a prediction direction for coding the current block in a predetermined coding mode is fixed.

5 Claims, 42 Drawing Sheets

(51) Int. Cl.
    *H04N 19/46*       (2014.01)
    *H04N 19/573*     (2014.01)
    *H04N 19/513*     (2014.01)
    *H04N 19/147*     (2014.01)

(52) U.S. Cl.
    CPC ........... *H04N 19/46* (2014.11); *H04N 19/513* (2014.11); *H04N 19/573* (2014.11)

(58) Field of Classification Search
    USPC ........................................ 375/240.15, 240.12
    See application file for complete search history.

(56) References Cited

U.S. PATENT DOCUMENTS

| | | | |
|---|---|---|---|
| 6,785,331 B1 | 8/2004 | Jozawa et al. | |
| 7,453,941 B1 | 11/2008 | Yamori et al. | |
| 2003/0215014 A1* | 11/2003 | Koto | H04N 19/105 375/240.16 |
| 2004/0008784 A1 | 1/2004 | Kikuchi et al. | |
| 2004/0057523 A1 | 3/2004 | Koto et al. | |
| 2004/0136461 A1 | 7/2004 | Kondo et al. | |
| 2004/0190615 A1 | 9/2004 | Abe et al. | |
| 2004/0213468 A1* | 10/2004 | Lee | H04N 19/197 382/236 |
| 2004/0234143 A1* | 11/2004 | Hagai | H04N 19/105 382/238 |
| 2007/0076967 A1* | 4/2007 | Kim | H04N 19/107 382/239 |
| 2007/0211802 A1 | 9/2007 | Kikuchi et al. | |
| 2007/0291131 A1* | 12/2007 | Suzuki | H04N 19/105 348/222.1 |
| 2008/0025398 A1 | 1/2008 | Molly et al. | |
| 2008/0123972 A1 | 5/2008 | Sekiguchi et al. | |
| 2009/0116558 A1* | 5/2009 | Chen | H04N 19/597 375/240.16 |
| 2010/0266042 A1* | 10/2010 | Koo | H04N 19/597 375/240.16 |
| 2011/0293195 A1* | 12/2011 | Nakagami | H04N 19/107 382/233 |

FOREIGN PATENT DOCUMENTS

| | | |
|---|---|---|
| JP | 2004-48711 | 2/2004 |
| WO | 2010/070818 | 6/2010 |

OTHER PUBLICATIONS

"Test Model under Consideration", Joint Collaborative Team on Video Coding (JCT-VC) of ITU-T SG16 WP3 and ISO/IEC JTC1/SC29/WG11, 2nd Meeting: Geneva, CH, Jul. 21-28, 2010, JCTVC-B205 draft007 (Date Saved: Oct. 6, 2010), p. 38, 61-63, 80-82.
International Search Report dated Mar. 13, 2012 in International Application No. PCT/JP2011/007002.
Office Action dated Jan. 11, 2017 in corresponding U.S. Appl. No. 15/205,101.
Office Action dated Jun. 14, 2017 issued in corresponding U.S. Appl. No. 15/205,101.
US Final Office Action dated Dec. 20, 2018 in U.S. Appl. No. 15/205,101.
Office Action dated May 10, 2018 in U.S. Appl. No. 15/205,101.
Office Action dated Sep. 13, 2019 in U.S. Appl. No. 15/205,101.

* cited by examiner

FIG. 16

```
skip_flag
if (skip_flag == 1) {
    [Coding information of prediction direction 1]
    [Coding information of prediction direction 2]
}
else {
    pred_mode
    if (predmode == Motion vector estimation mode) {
        inter_pred_idc
        if (inter_pred_idc == Uni-directional prediction 1) {
            [Coding information of prediction direction 1]
        }
        if (inter_pred_idx == Uni-directional prediction 2 or bi-directional prediction) {
            [Coding information of prediction direction 2]
        }
    }
    else if (predmode == Direct mode) {
        if (Direct mode prediction direction fixing flag is OFF) {
            inter_pred_idc
        }
        if (Direct mode prediction direction fixing flag is ON or inter_pred_idc == Uni-directional prediction 1) {
            [Coding information of prediction direction 1]
        }
        if (Direct mode prediction direction fixing flag is ON or inter_pred_idc == (Uni-directional prediction 2 or bi-directional prediction)) {
            [Coding information of prediction direction 2]
        }
    }
}
```

Skip flag

Inter prediction mode

Inter prediction direction flag

Inter prediction direction flag

FIG. 22

```
skip_flag
if (skip_flag == 1) {
  [Coding information of prediction direction 1]
  [Coding information of prediction direction 2]
} else {
  pred_mode
  if (predmode == Motion vector estimation mode) {
    inter_pred_idc
    if (inter_pred_idc == Uni-directional prediction 1) {
      [Coding information of prediction direction 1]
    }
    if (inter_pred_idc == Uni-directional prediction 2 or bi-directional prediction) {
      [Coding information of prediction direction 2]
    }
  } else if (predmode == Direct mode) {
    if (fixed_direct_pred == 0) {
      inter_pred_idc
    } else {
      inter_pred_idc = direct_pred_idc
    }
    if (inter_pred_idc == Uni-directional prediction 1) {
      [Coding information of prediction direction 1]
    }
    if (inter_pred_idc == (Uni-directional prediction 2 or bi-directional prediction)) {
      [Coding information of prediction direction 2]
    }
  }
}
```

Skip flag

Inter prediction mode

Inter prediction direction flag

Direct mode prediction direction fixing flag

```
Picture header
{
  ...
  fixed_direct_pred
  if (fixed_direct_pred == 1) {
    direct_pred_idc
  }
  ...
}
```

Direct mode prediction direction flag

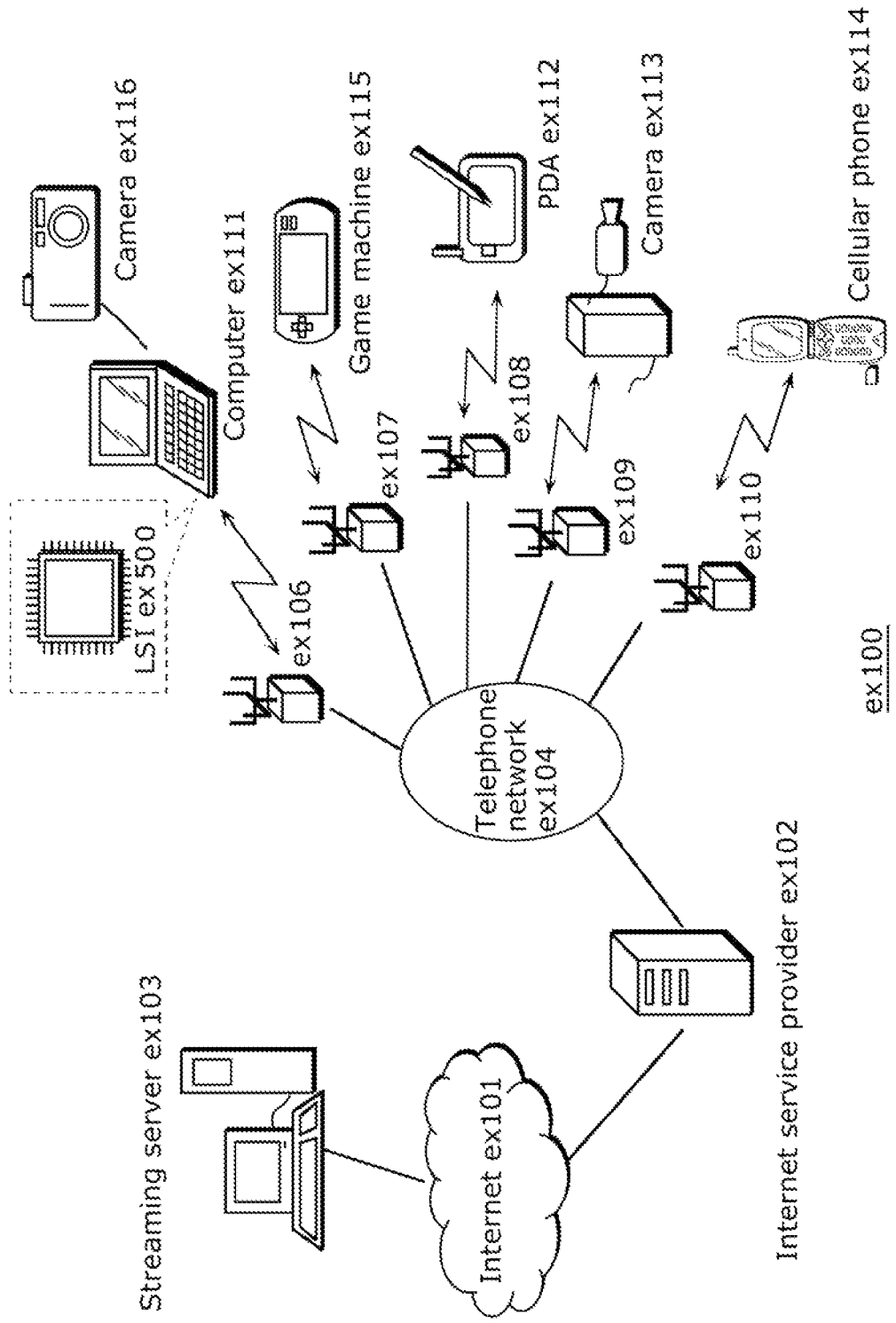

FIG. 28
(a)
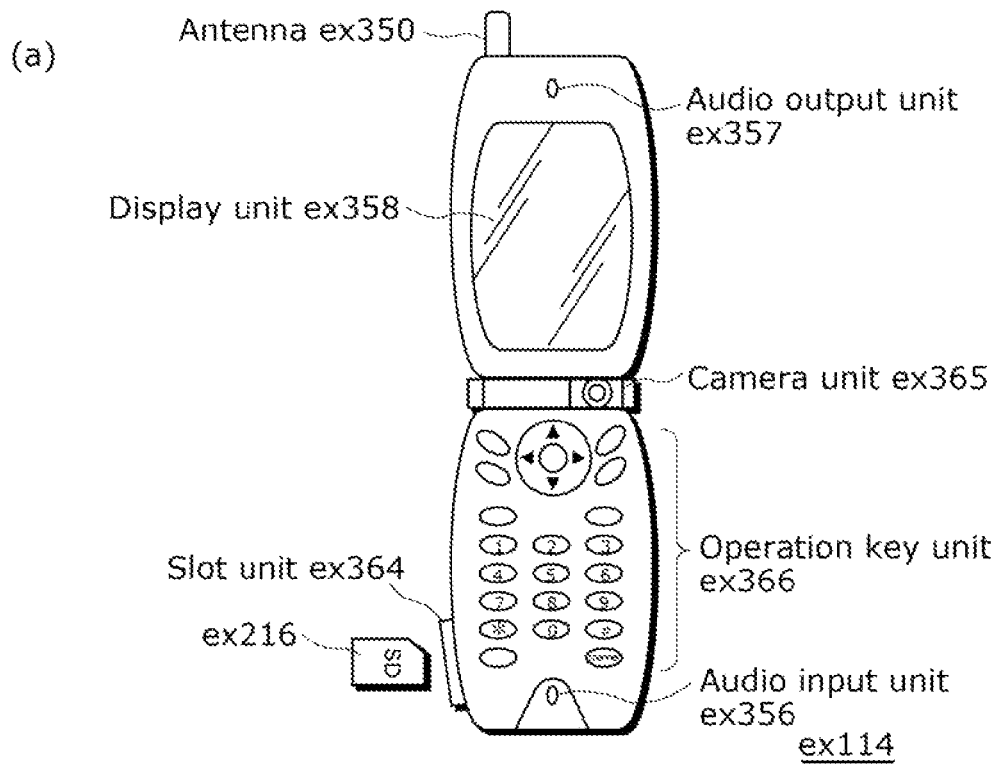
(b)
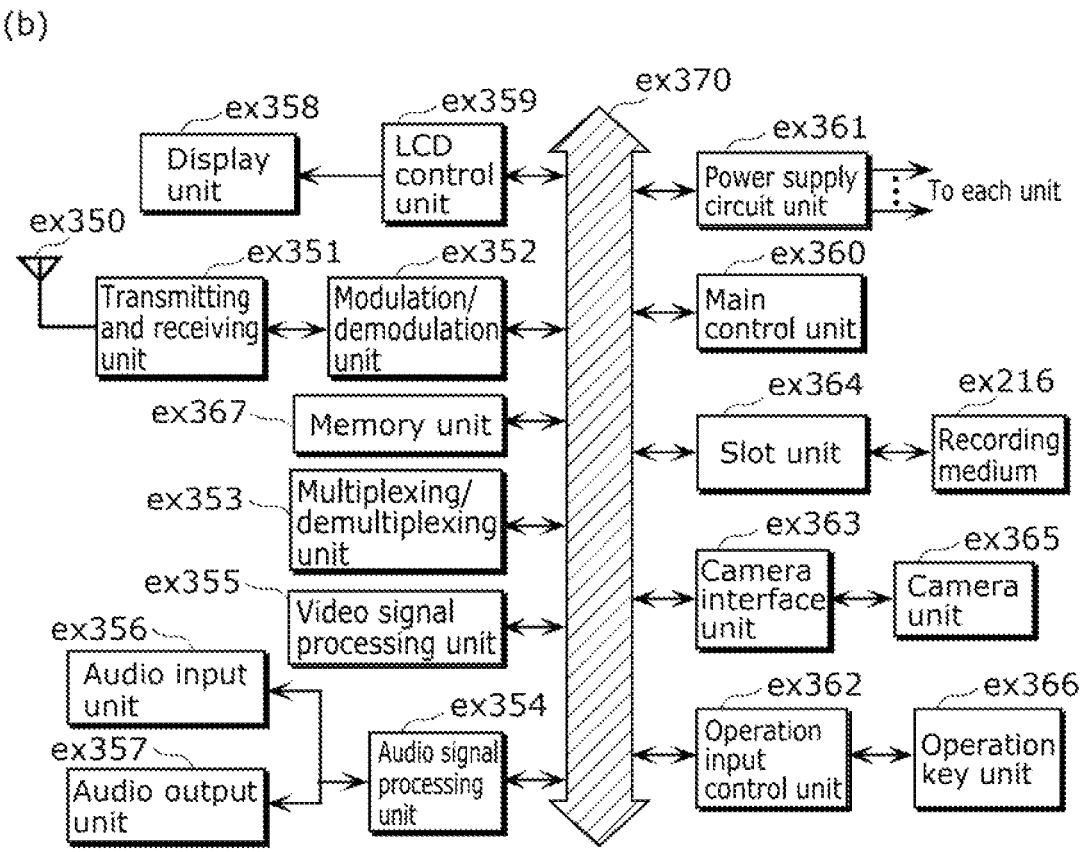

FIG. 29

| |
|---|
| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 32
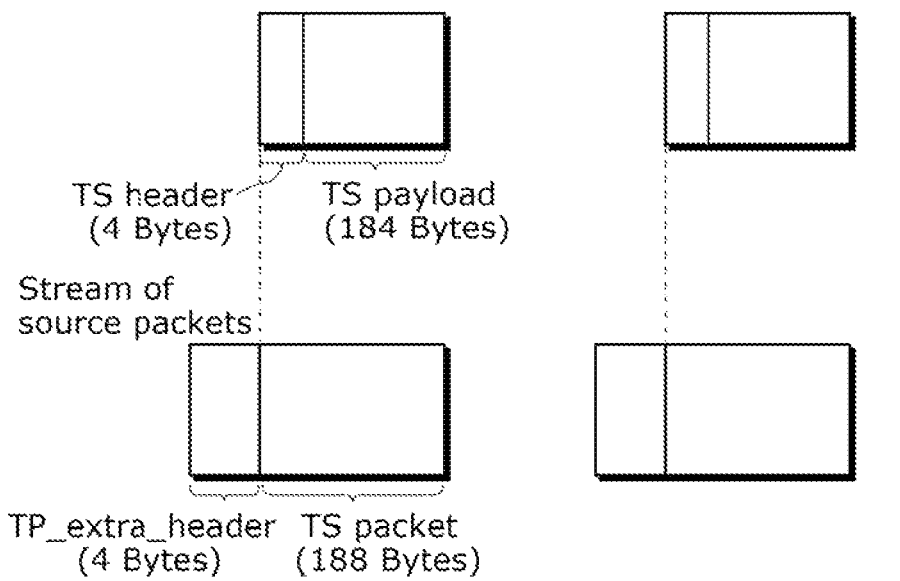
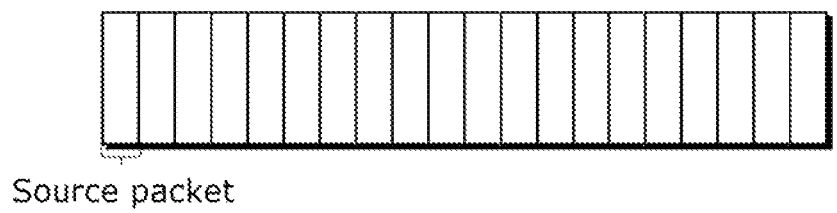

FIG. 40

| Corresponding standard | Driving frequency |
|---|---|
| MPEG-4 AVC | 500 MHz |
| MPEG-2 | 350 MHz |
| ⋮ | ⋮ |

FIG. 41
(a)
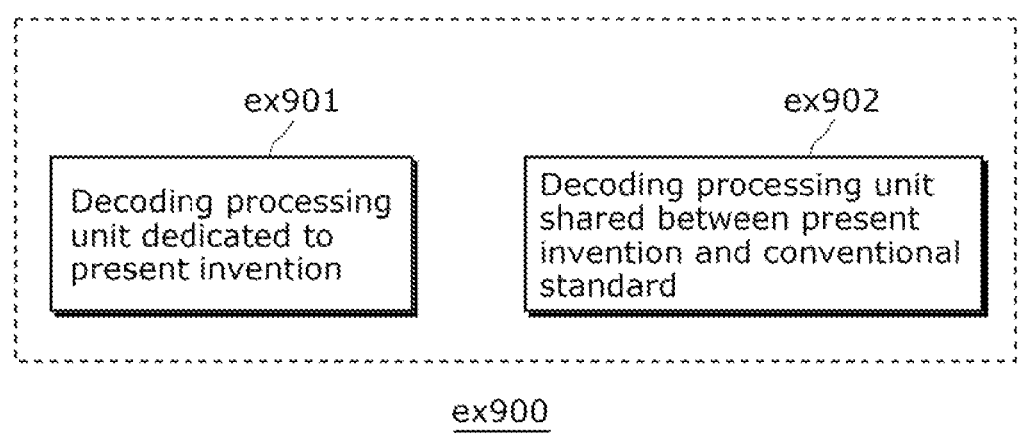
(b)
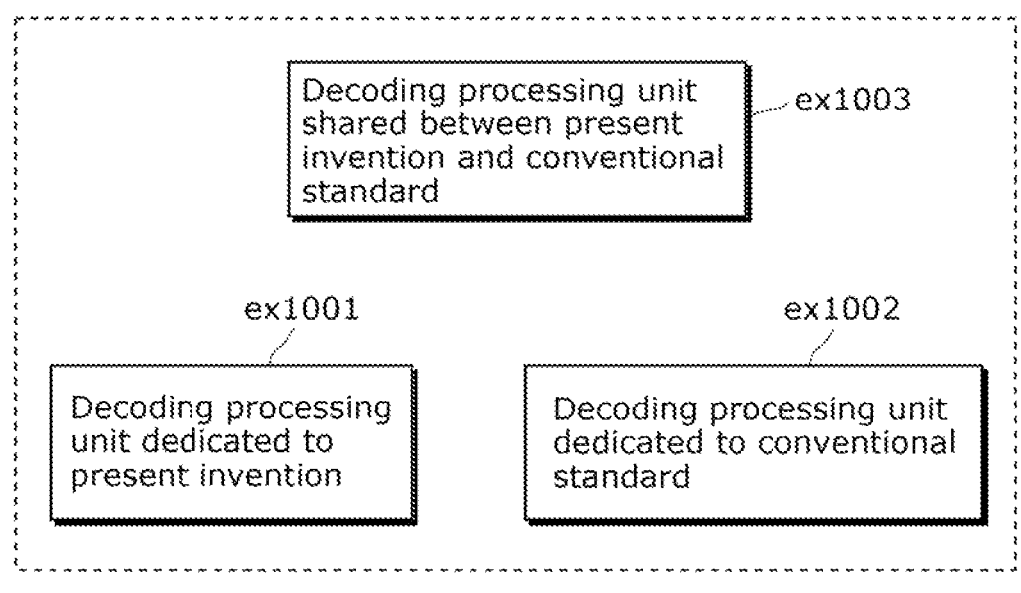

IMAGE CODING METHOD AND IMAGE DECODING METHOD

This application claims the benefit of provisional application No. 61/424,086, filed Dec. 17, 2010.

TECHNICAL FIELD

The present invention relates to image coding methods and image decoding methods.

BACKGROUND ART

In moving picture coding processes, the amount of data is generally reduced using redundancy of the moving pictures in spatial and temporal directions. Here, a method using the redundancy in the spatial direction is generally represented by the transformation into the frequency domain. A method using the redundancy in the temporal direction is represented by an inter-picture prediction (hereinafter referred to as inter prediction) coding process. In the inter prediction coding process, when coding a certain picture, a picture which has been already coded and is located, in display time order, before or after the current picture to be coded is used as a reference picture. Subsequently, a motion vector is estimated through motion estimation of the current picture with respect to the reference picture, and a difference is calculated between image data of the current picture and prediction picture data resulting from motion compensation based on the motion vector, to remove the redundancy in the temporal direction.

In the moving picture coding scheme called H.264, which has already been standardized, three types of pictures: I-picture, P-picture, and B-picture, are used to reduce the amount of data. The I-picture is a picture on which no inter prediction coding process is performed, that is, on which only an intra-picture prediction (hereinafter referred to as intra prediction) coding process is performed. The P-picture is a picture on which the inter prediction coding process is performed with reference to only one picture which has been already coded and is located before or after the current picture in display time order. The B-picture is a picture on which the inter prediction coding process is performed with reference to two pictures which have been already coded and is located before or after the current picture in display time order.

Furthermore, in the moving picture coding method known as H.264, as an inter prediction coding mode for each current block in a B-picture, there is a motion vector estimation mode of coding (a) difference values of image data between prediction image data and image data of the current block and (b) a motion vector used in generating the prediction image data, a direct mode in which only difference values of the image data are coded and a motion vector is predicted from a surrounding block, and a skip mode in which neither difference values of image data nor a motion vector is coded and a prediction image of the position indicating a motion vector predicted from a surrounding block and the like is directly determined as a decoded image.

At the motion vector estimation mode of the B-picture, either bi-directional prediction or uni-directional prediction is selected as a prediction direction of the current block. In the bi-directional prediction, a prediction image is generated with reference to two pictures which have been already coded and are located before or after the current picture. On the other hand, in the uni-directional prediction, a prediction image is generated with reference to one picture which has been already coded and is located before or after the current picture.

Meanwhile, in the direct mode of the B-picture, the prediction direction of the current block to be coded is determined according to a prediction mode of the surrounding blocks and the like. A specific example is described with reference to FIG. 42. In FIG. 42, a coded block on the left neighboring of the current block to be coded is determined as a neighboring block A, a coded block above the neighboring of the current block is determined as a neighboring block B, and a coded block on the top right neighboring of the current block is determined as a neighboring block C. Moreover, the neighboring block A performs bi-directional prediction, the neighboring block B performs uni-directional prediction, and the neighboring block C performs uni-directional prediction. The prediction direction of the current block to be coded in a direct mode is a bi-directional prediction when the neighboring blocks include at least one block which has been coded using bi-directional prediction. In the case of FIG. 42, a bi-directional prediction is selected for the prediction direction of the current block to be coded.

CITATION LIST

Non Patent Literature

[NPL 1]
ITU-T H. 264 03/2010

SUMMARY OF INVENTION

However, in the conventional method for determining the prediction direction in a direct mode, for example, there is a problem that since bi-directional prediction is always selected even when estimation accuracy for a bi-directional prediction vector 2 in the neighboring block A in FIG. 42 is low, the prediction picture in direct mode is degraded and coding efficiency is reduced.

The present invention has an object to solve the above problems and aims to derive the prediction direction in the best direct mode for the picture to be coded and increase coding efficiency, by using a new determination standard for selecting a prediction direction in a direct mode.

An image coding method according to an aspect of the present invention is an image coding method for coding a current block, by assigning two or more reference picture indexes to one or more reference pictures that are different from a current picture which includes the current block, the image coding method comprising the following when the two or more reference picture indexes are used to code the current block: determining whether or not reference pictures identified by two or more reference picture indexes are identical to each other; and switching, based on a result of the determining, between whether or not a prediction direction for coding the current block in a predetermined coding mode is fixed.

Moreover, the predetermined coding mode is a direct mode, and in the switching: when the result of the determining is true, the prediction direction in the direct mode is set to bi-directional prediction for coding with reference to two or more reference pictures; and when the result of the determining is false, one of (i) the bi-directional prediction and (ii) unidirectional prediction for coding with reference to one reference picture is selected as the prediction direction of the current block, and a prediction direction flag indicating the selected prediction direction is added into a bitstream.

An image coding method according to another aspect of the present invention is an image coding method for coding a current block, by assigning two or more reference picture indexes to one or more reference pictures that are different from a current picture which includes the current block, the image coding method comprising the following when the two or more reference picture indexes are used to code the current block: adding, into header data a prediction direction fixing flag indicating whether or not a prediction direction for coding the current block in a predetermined coding mode is fixed; and coding the current block in the predetermined coding mode, based on the prediction direction fixing flag.

Moreover, the predetermined coding mode is a direct mode, when the prediction direction fixing flag is ON, the prediction direction is set to bi-directional prediction in which two or more reference pictures are referred, and when the prediction direction fixing flag is OFF, one of (i) the bi-directional prediction and (ii) uni-directional prediction for coding with reference to one reference picture is selected as the prediction direction of the current block, and a prediction direction flag indicating the selected prediction direction is added into a bitstream.

An image coding method according to another aspect of the present invention is an image coding method for coding a current block, by assigning two or more reference picture indexes to one or more reference pictures that are different from a current picture which includes the current block, the image coding method comprising the following when the two or more reference picture index are used to code the current block: adding, into header data, (i) a prediction direction fixing flag indicating whether or not a prediction direction for coding the current block in a predetermined coding mode is fixed and (ii) a first prediction direction flag indicating the fixed prediction direction; and coding the current block in the predetermined coding mode, based on the prediction direction fixing flag and the first prediction direction flag.

Moreover, it is desirable that the predetermined coding mode is a direct mode, wherein when the prediction direction, fixing flag is ON, the prediction direction identified by the first prediction direction flag is set to the prediction direction of the current block, and when the prediction direction fixing flag is off, one of (i) bi-directional prediction for coding with reference to two or more reference pictures and (ii) uni-directional prediction for coding with reference to one reference picture is selected as the prediction direction of the current block, and a second prediction direction flag indicating the selected prediction direction is added into a bitstream.

Moreover, it is desirable that in the determining, by using a display order or a coding order of the reference pictures to which the two or more reference picture indexes are assigned it is determined whether or not the reference pictures identified by the two or more reference picture indexes are identical to each other.

An image decoding method according to an aspect of the present invention is an image decoding method for decoding a current block, by assigning two or more reference picture indexes to one or more reference pictures that are different from a current picture which includes the current block, the image decoding method comprising the following when the two or more reference picture indexes are used to decode the current block: determining whether or not reference pictures identified by two or more reference picture indexes are identical to each other; and switching, based on a result of the determining, between whether or not a prediction direction for decoding the current block in a predetermined decoding mode is fixed.

Moreover, it is desirable that the predetermined decoding mode is a direct mode, and in the switching: when the result of the determining is true, the prediction direction in the direct mode is set to bi-directional prediction for decoding with reference to two or more reference pictures; and when the result of the determining is false, a prediction direction flag in the direct mode is decoded from a bitstream and the current block is decoded based on the decoded prediction direction flag.

An image decoding method according to another aspect of the present invention is an image decoding method for decoding a current block, by assigning two or more reference picture indexes to one or more reference pictures that are different from a current picture which includes the current block, the image decoding method comprising the following when the two or more reference picture indexes are used to decode the current block: decoding, from a bitstream, a prediction direction fixing flag indicating whether or not a prediction direction for decoding the current block in a predetermined decoding mode is fixed; and decoding the current block in the predetermined decoding mode based on the prediction direction fixing flag.

Moreover, it is desirable that the predetermined decoding mode is a direct mode, wherein when the prediction direction fixing flag is ON, the prediction direction is set to bi-directional prediction referring to two or more reference pictures, and when the prediction direction fixing flag is OFF, a prediction direction flag in the direct mode is decoded from the bitstream and the current block is decoded based on the decoded prediction direction flag.

An image decoding method according to another aspect of the present invention is an image decoding method for decoding a current block, by assigning two or more reference picture indexes to one or more reference pictures that are different from a current picture which includes the current block, the image decoding method comprising the following when the two or more reference picture indexes are used to decode the current block: decoding, from a bitstream, (i) a prediction direction fixing flag indicating whether or not a prediction direction for decoding the current block in a predetermined decoding mode is fixed and (ii) the fixed first prediction direction flag; and decoding the current block in the predetermined decoding mode, based on the prediction direction fixing flag and the first prediction direction flag.

Moreover, it is desirable that the predetermined decoding mode is a direct mode, wherein when the prediction direction fixing flag is ON, the first prediction direction flag is set to the prediction direction of the current block, and when the prediction direction fixing flag is OFF, a second prediction direction flag in the direct mode is decoded from the bitstream and the current block is decoded based on the decoded second prediction direction.

Moreover, it is desirable that in the determining, by using a display order or a coding order of the reference pictures to which the two or more reference picture indexes are assigned, it is determined whether or not the reference pictures identified by the two or more reference picture indexes are identical to each other.

By using a new standard for selecting the prediction direction in a direct mode, the present invention makes it possible to derive the prediction direction in the best direct mode for the current picture to be coded and to increase coding efficiency.

BRIEF DESCRIPTION OF DRAWINGS

FIG. 16 is a block diagram showing an example of a syntax of a bitstream in the moving picture decoding method according to Embodiment 4 of the present invention.

FIG. 22 is an example of a syntax of a bitstream in the moving picture decoding method according to Embodiment 6 of the present invention.

FIG. 23 illustrates an overall configuration of a content providing system for implementing content distribution services.

(a) in FIG. 28 shows an example of a cellular phone, and (b) in FIG. 28 is a block diagram showing an example of a configuration of the cellular phone.

FIG. 29 illustrates a structure of the multiplexed data.

Figure 30:
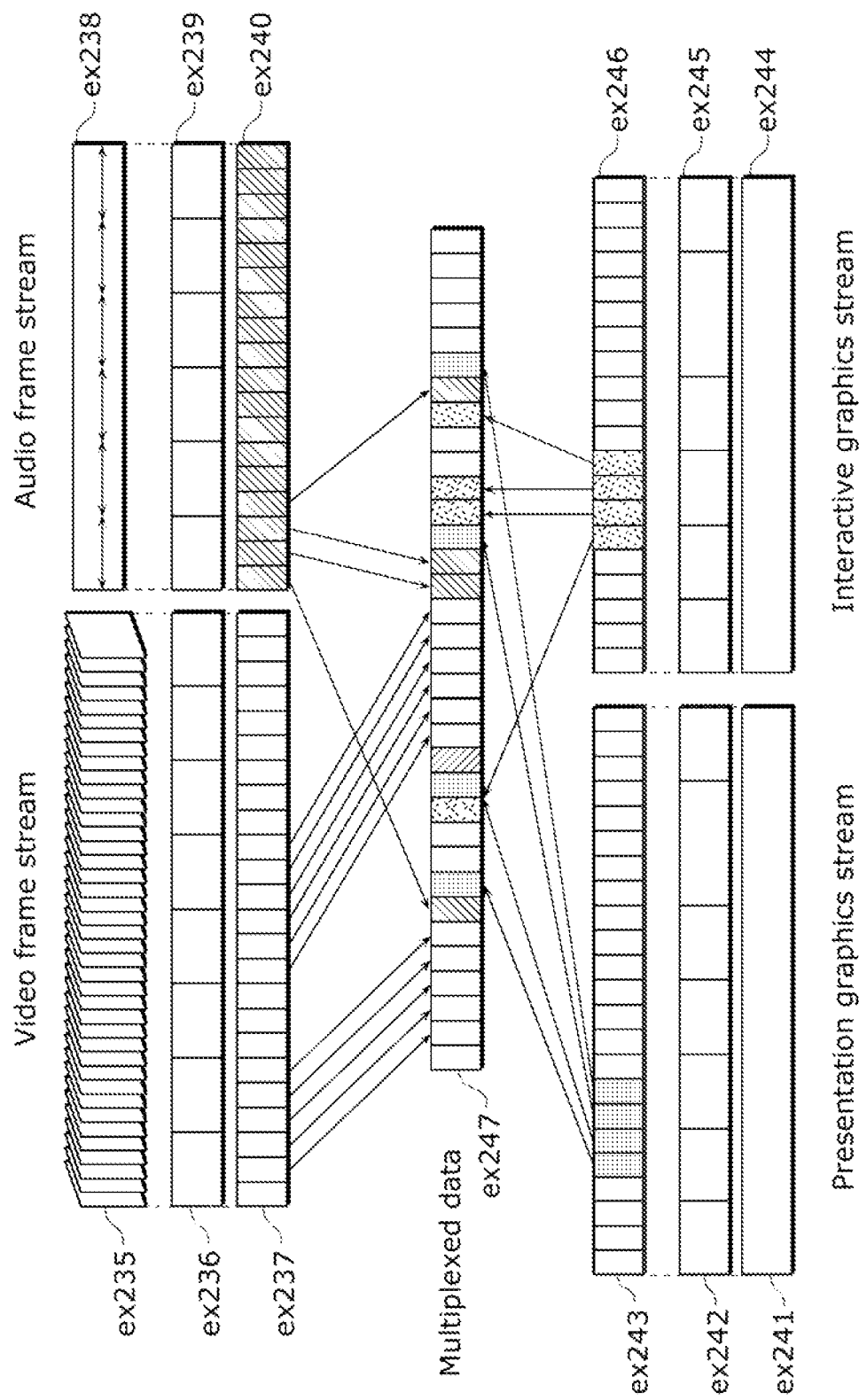

FIG. 30 schematically illustrates how each of streams is multiplexed in multiplexed data.

Figure 31:
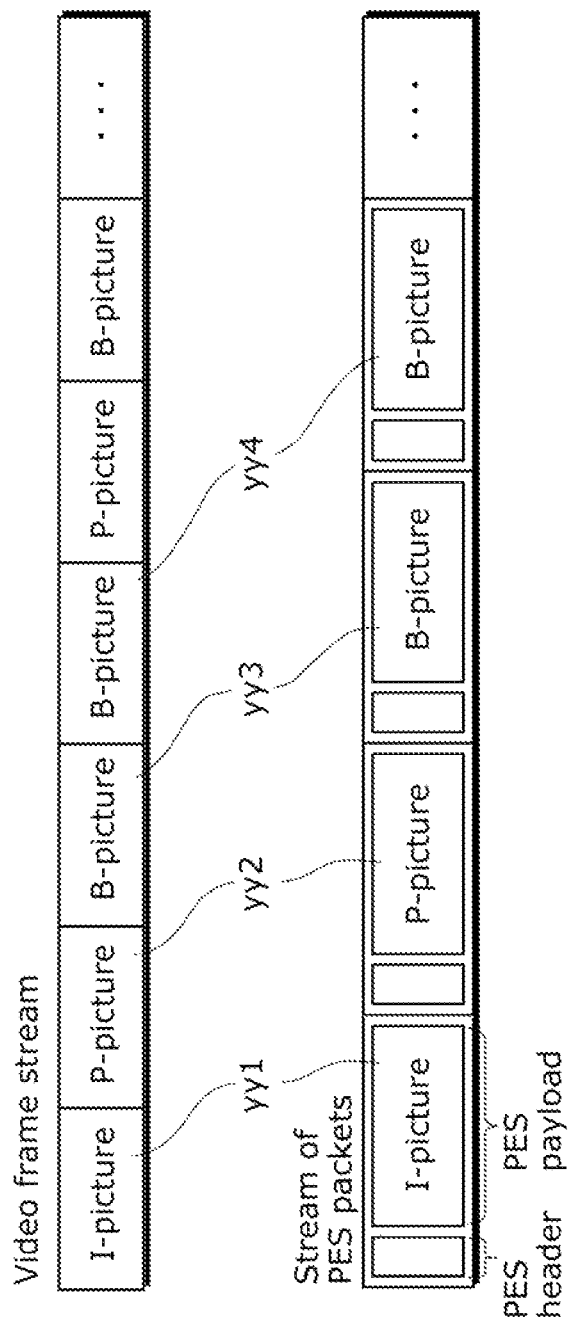

FIG. 31 illustrates how a video stream is stored in a stream of PES packets in more detail.

FIG. 32 shows a structure of TS packets and source packets in the multiplexed data.

Figure 33:
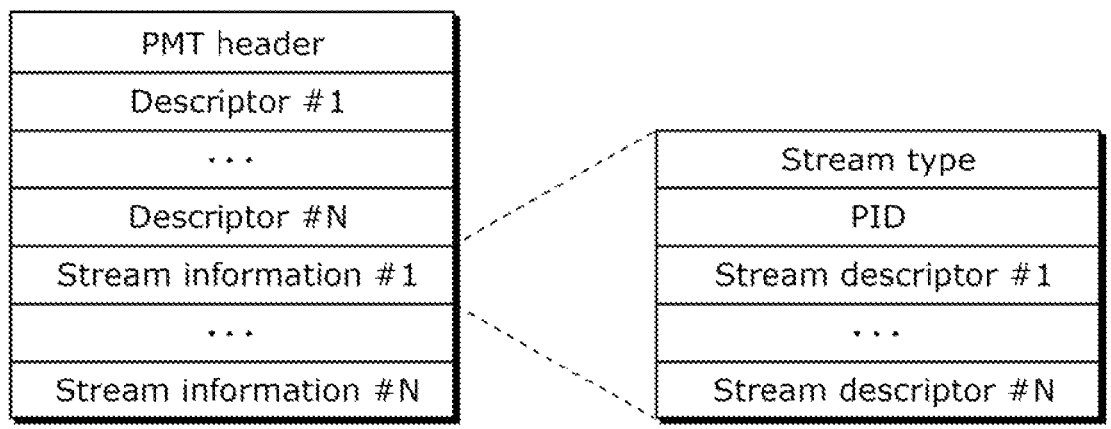

FIG. 33 shows a data structure, of a PMT.

Figure 34:
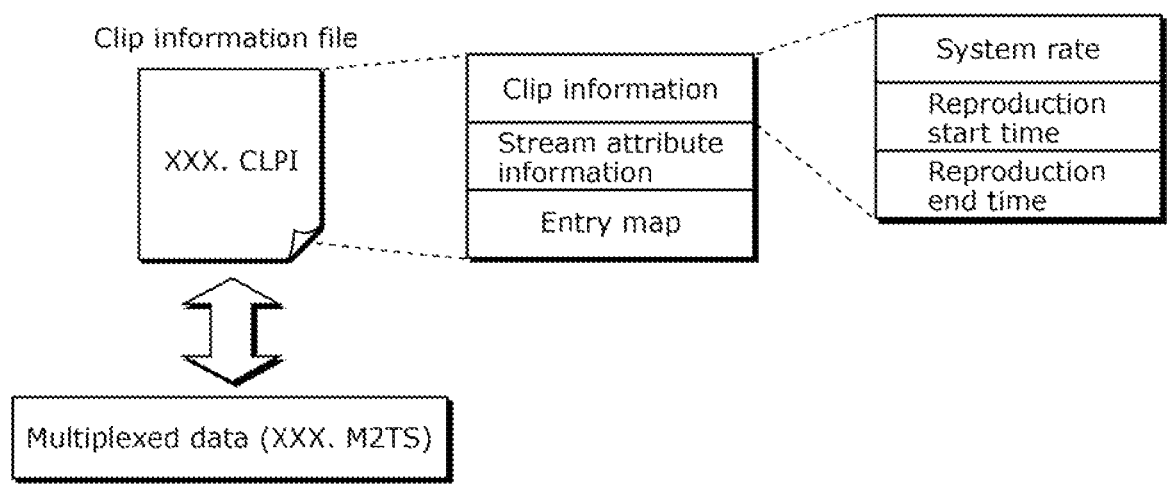

FIG. 34 illustrates an internal structure of multiplexed data information.

Figure 35:
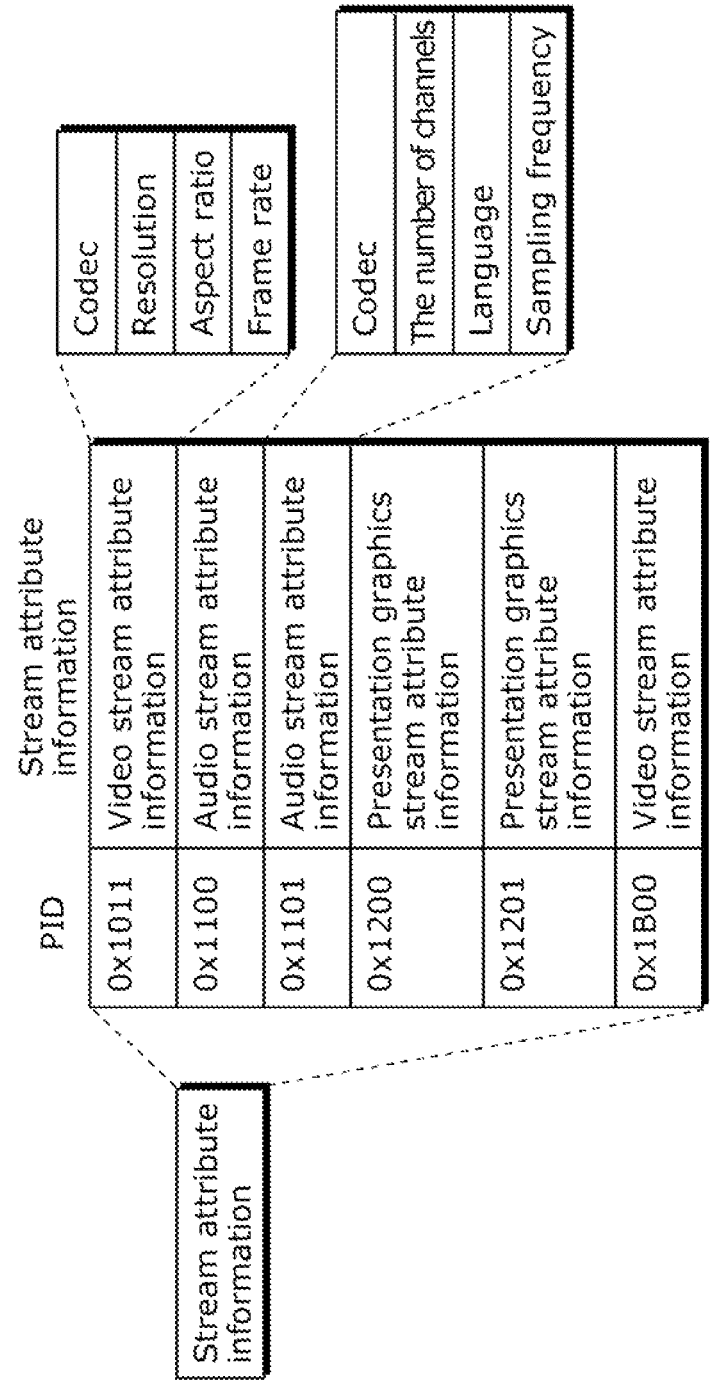

FIG. 35 shows an internal structure of stream attribute information.

Figure 36:
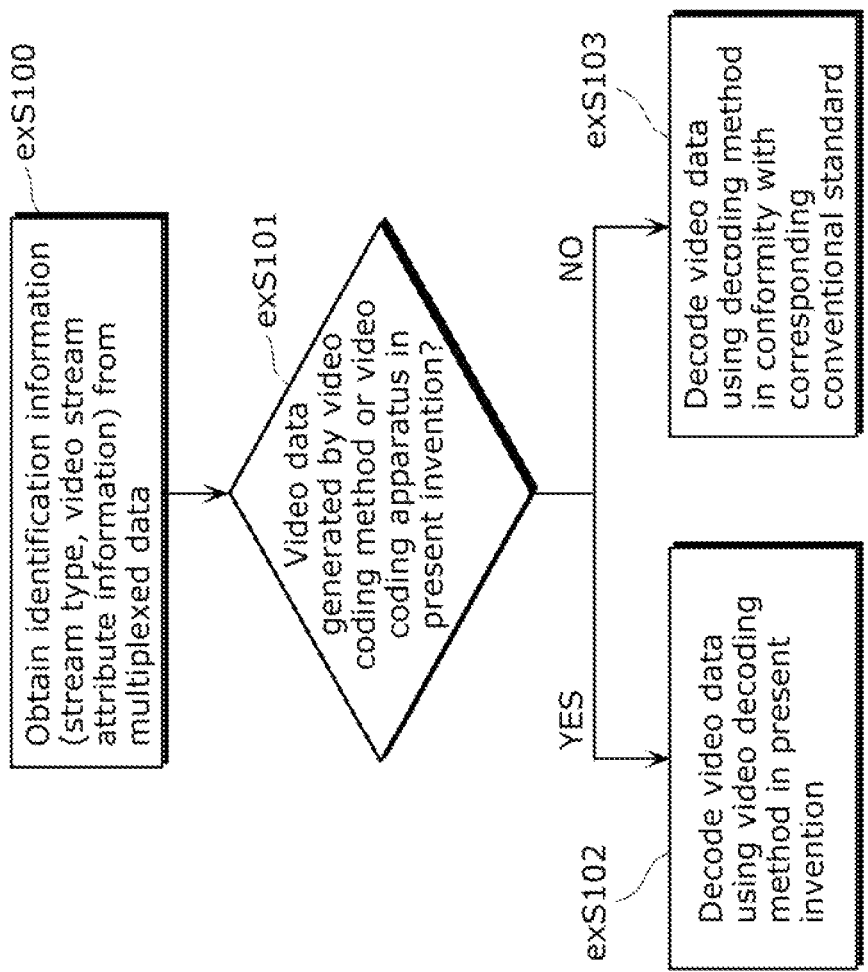

FIG. 36 scows steps for identifying video data.

Figure 37:
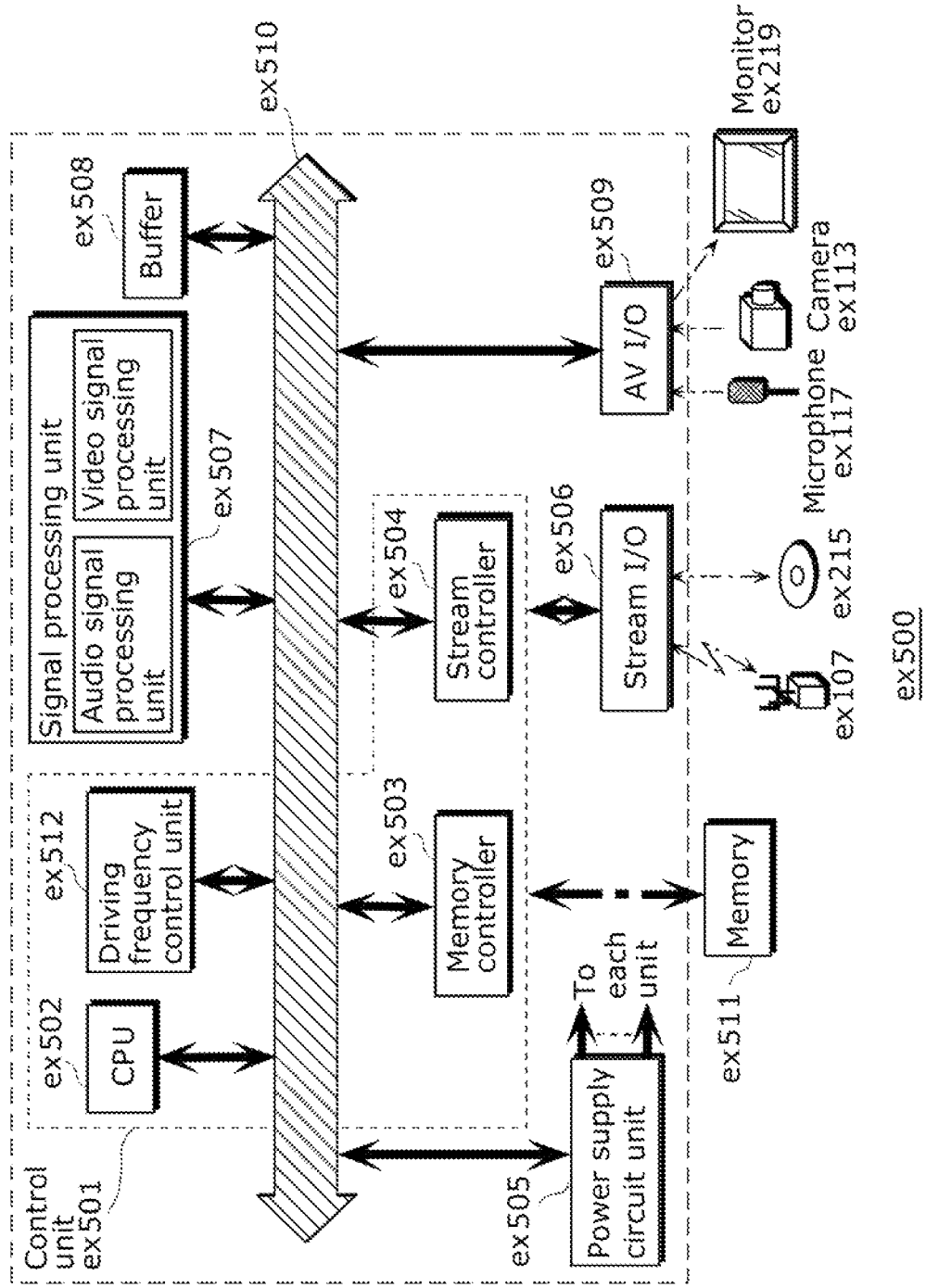

FIG. 37 is a block diagram illustrating an example of a configuration of an integrated circuit for implementing the moving picture coding method and the moving picture decoding method according to each of Embodiments.

Figure 38:
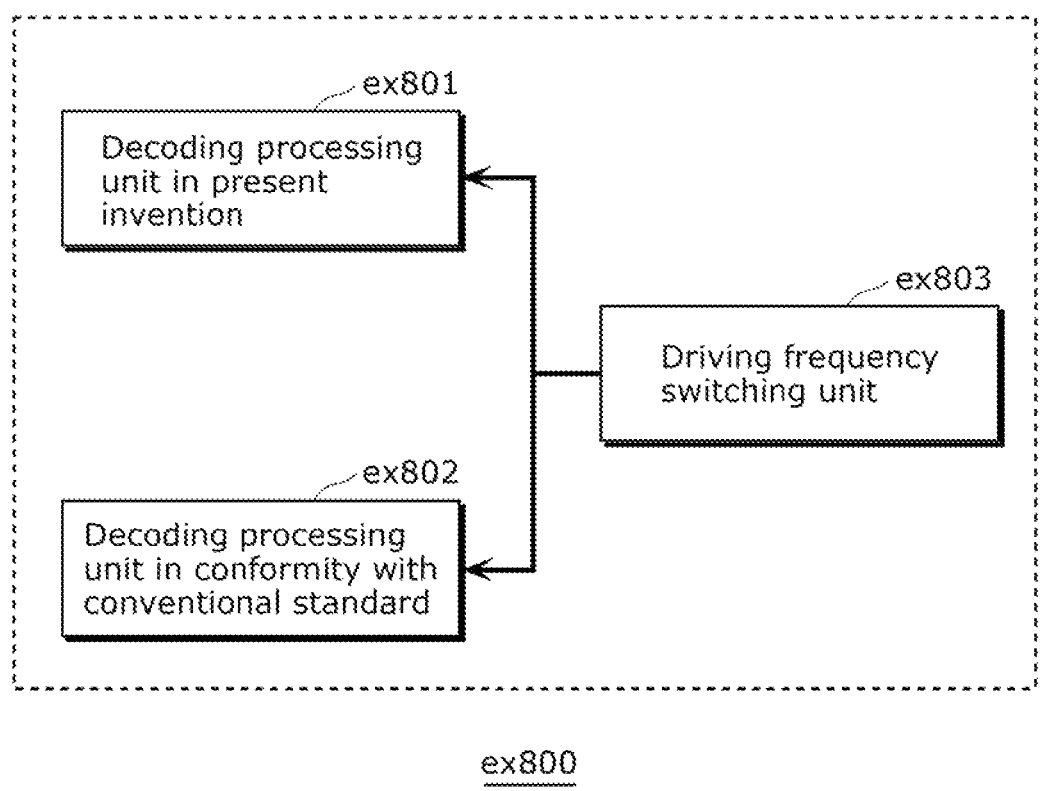

FIG. 38 shows a configuration for switching between driving frequencies.

Figure 39:
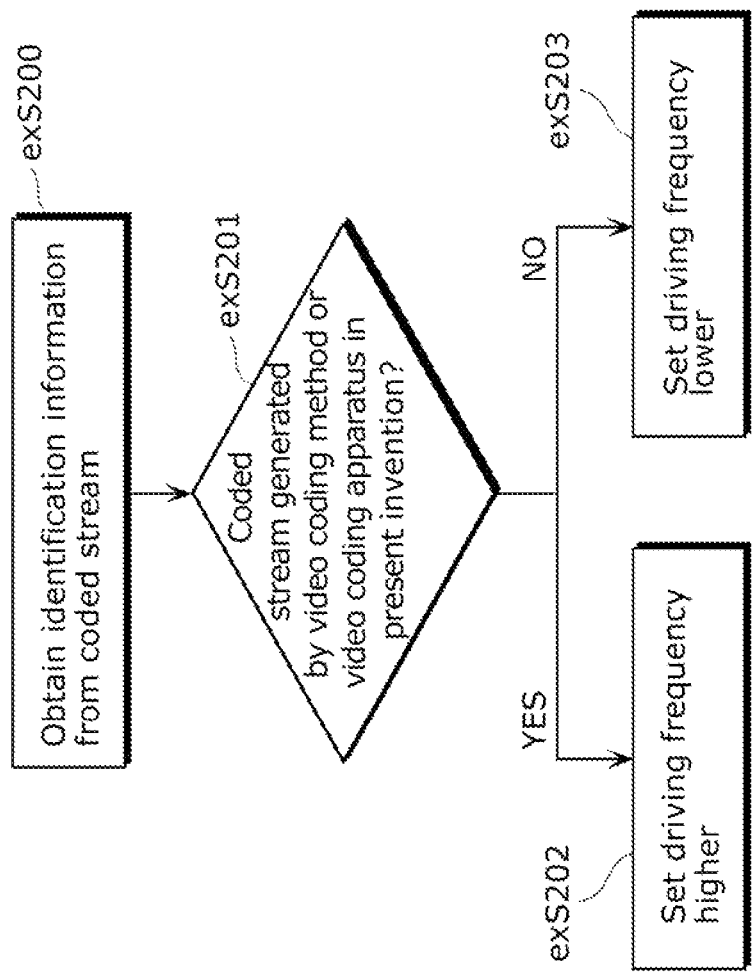

FIG. 39 shows steps for identifying vide data and switching between driving frequencies.

FIG. 40 shows an example of a look-up table in which standards of video data are associated with the driving frequencies.

(a) in FIG. 41 shows an example of a configuration for sharing a module of a signal processing unit, and (b) in FIG. 41 is a diagram showing another example of a configuration for sharing a module of a signal processing unit.

Figure 42:
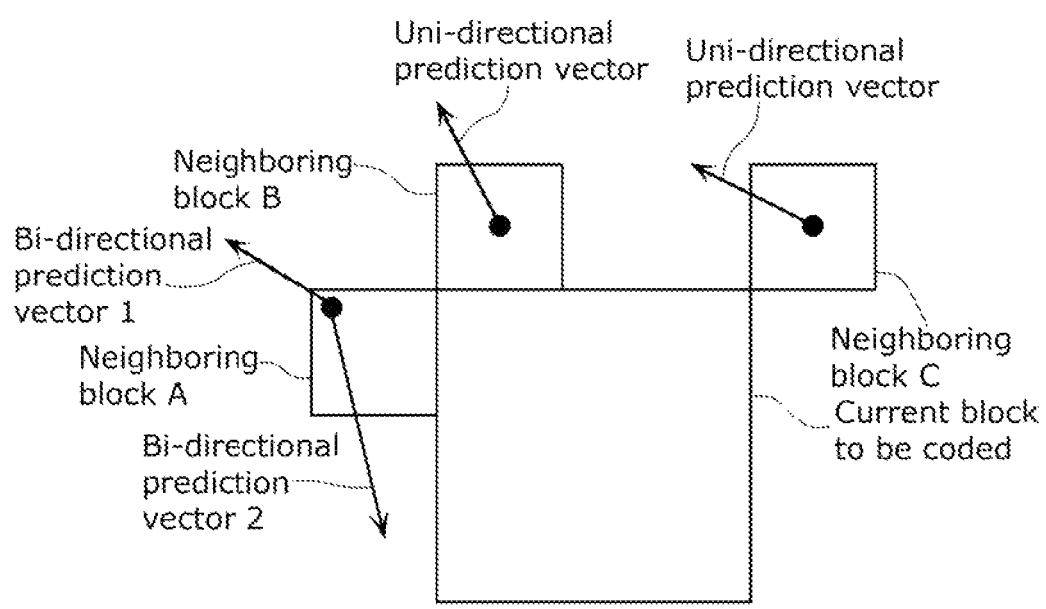

FIG. 42 is a diagram for describing a conventional moving picture coding method.

DETAILED DESCRIPTION OF INVENTION

The following will describe a moving picture coding method (an image coding method), a moving picture coding apparatus (an image coding apparatus), a moving picture decoding method (an image decoding method), a moving picture decoding apparatus (an image decoding apparatus), and an image coding and decoding apparatus according to embodiments with reference to the drawings. It is to be noted that embodiments to be described later show favorable examples of the present invention. In other words, the numerical values, shapes materials, structural elements, the arrangement and connection of the structural elements, steps, the processing order of the steps etc. shown in the following embodiments are mere examples, and therefore do not limit the inventive concept. The scope of the present invention is defined in the appended Claims and their equivalents. Therefore, among the structural elements in the following embodiments, structural elements not recited in any one of the independent claims defining the most generic part of the inventive concept are described as arbitrary structural elements, although they are not absolutely necessary to achieve the goal of the present invention.

Embodiment 1

Figure 1:
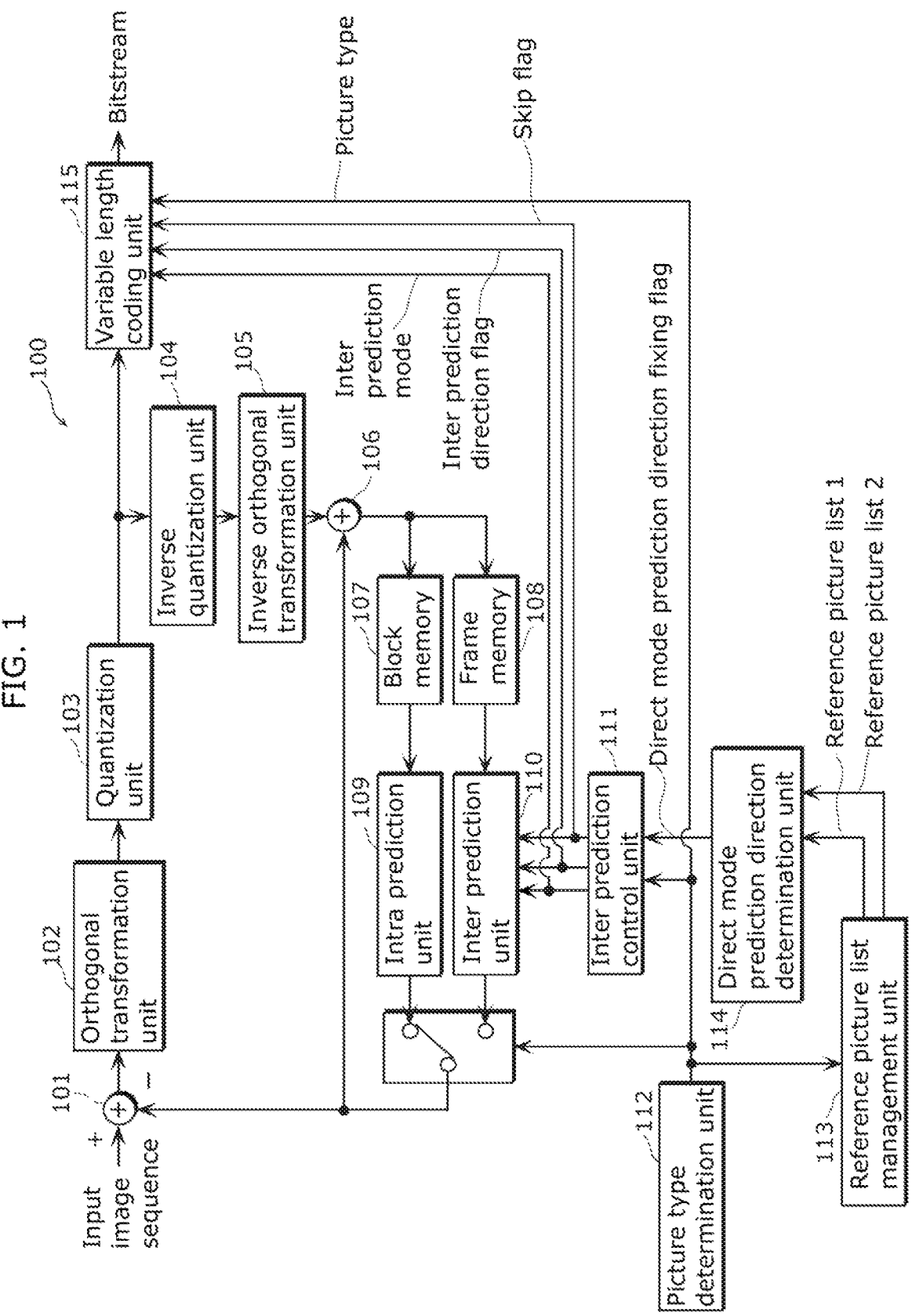
FIG. 1 is a block diagram showing a structure of a moving picture coding apparatus using a moving picture coding method according to Embodiment 1 of the present invention.

FIG. 1 is a block diagram of a moving picture coding apparatus using a moving picture coding method according to Embodiment 1 of the present invention.

A moving picture coding apparatus 100, as shown in FIG. 1, includes a subtracting unit 101, an orthogonal transformation unit 102, a quantization unit 103, an inverse quantization unit 104, an inverse orthogonal transformation unit 105, an adding unit 106, a block memory 107, a frame memory 108, an intra prediction unit 109, an inter prediction unit 110, an inter prediction control unit 111, a picture type determination unit 112, a reference picture list management unit 113, a direct mode prediction direction determination unit 114, and a variable length coding unit 115.

The subtracting unit 101 calculates prediction residual data that is a difference between an input image sequence and the prediction image data generated by the intra prediction unit 109 or the inter prediction unit 110 to be described later. The orthogonal transformation unit 102 transforms the prediction residual data from an image domain to a frequency domain. The quantization unit 103 quantizes the prediction residual data that is transformed into a frequency domain. The inverse quantization unit 104 inversely quantizes the prediction residual data that is quantized by the quantization unit 103. The inverse orthogonal transformation unit 105 transforms the prediction residual data from an image domain to a frequency domain. The adding unit 106 generates a decoded image by adding the prediction image data and, the inversely quantized prediction residual data. The block memory 107 stores the decoded image on a block-by-block basis, while the frame memory stores the decoded image on a frame-by-frame basis. The picture type determination unit 112 determines by which picture type from among an I-picture, a B-picture, or a P-picture, each picture in the input image sequence is to be coded, and generates picture type information. The intra prediction unit 109 generates the prediction image data by intra prediction of the current block to be coded, using the decoded image that is stored on a block-by-block basis in the block memory 107. The inter prediction unit 110 generates the prediction image data by inter prediction of the current block to be coded, using at least one decoded image that is stored on a frame-by-frame basis in the frame memory 108. The inter prediction control unit 111 determines an inter prediction mode.

Figure 2:
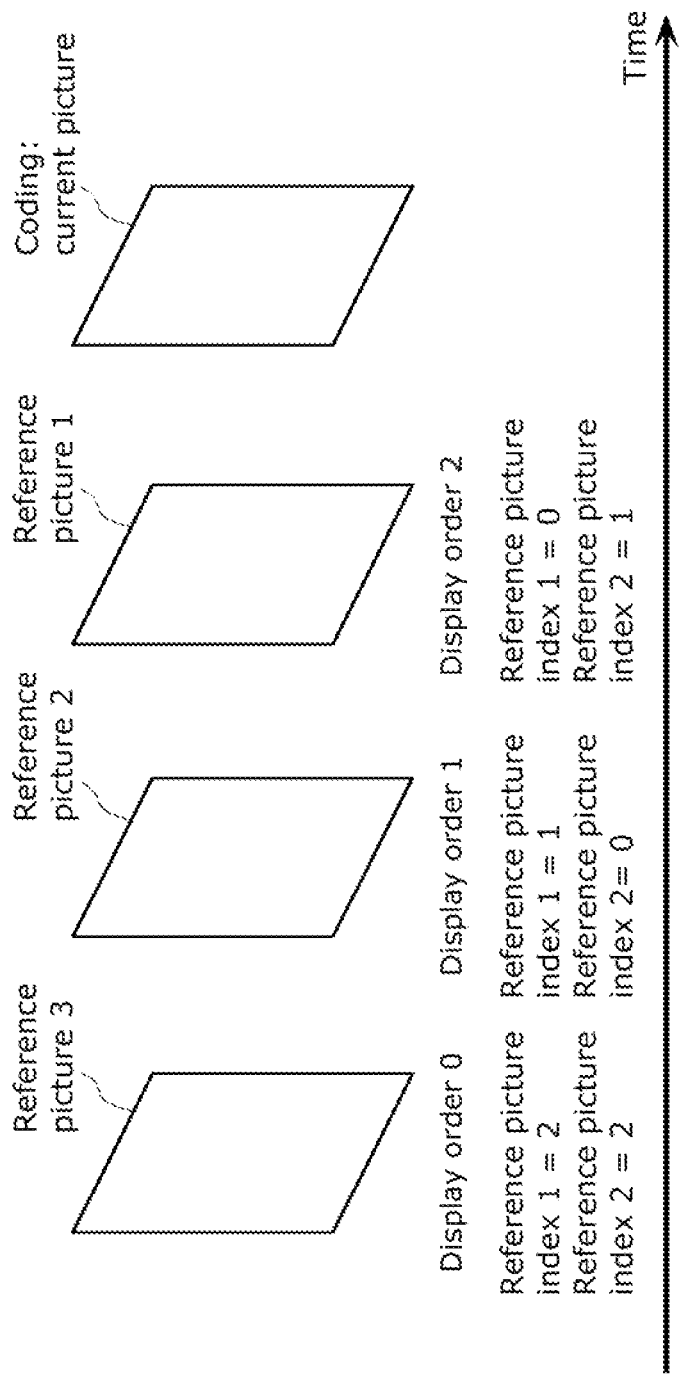
FIG. 2 is a diagram showing an example of one of reference lists for a B-picture.

The reference picture list management unit 113 assigns reference picture indexes to reference pictures in inter prediction, and generates a reference list including the reference picture indexes and display orders. For example, two reference lists are generated for a B-picture because the B-picture can be coded with reference to two pictures. FIG. 2 is a diagram showing an example of one of reference lists for a B-picture. A reference picture list 1 in FIG. 2 is an example of the reference picture list in a prediction direction 1 in bi-directional prediction. A reference picture index 1 with a value of 0 is assigned to a reference picture 1 with a display order 2. A reference picture index 1 with a value of 1 is assigned to a reference picture 2 with a display order 1. A reference picture index 1 with a value of 2 is assigned to a reference picture 3 with a display order 0. In other words, the reference picture indices are assigned to the reference pictures in order from temporally closest to the current picture in display order. Meanwhile, a reference picture list 2 is an example of the reference picture list in a prediction direction 2 in bi-directional prediction. A reference picture index 2 with a value of 0 is assigned to a reference picture 2 with a display order 1. A reference picture index 2 with a value of 1 is assigned to a reference picture 1 with a display order 2. A reference picture index 2 with a value of 2 is assigned to a reference picture 3 with a display order 0. As above, it is possible that the reference picture indices assigned to each reference picture have difference values in each prediction direction (reference pictures 1 and 2 in FIG. 2) and that the reference picture indices assigned to each reference picture have the same value in the respective prediction directions (a reference picture 3 in FIG. 2).

It is to be noted that in the present embodiment, the reference pictures are managed with the reference picture indexes and the display orders. However, the reference pictures may be managed with the reference picture indexes, coding orders and the like.

The direct mode prediction direction determination unit 114 determines the direct mode prediction direction of the current block in a direct mode in the following method, using the reference picture lists 1 and 2 generated by the reference picture list management unit 113.

The variable length coding unit 115 generates a bitstream by performing variable length coding on the quantized prediction residual data, inter prediction mode, inter prediction direction flag, skip flag, and picture type information.

Figure 3:
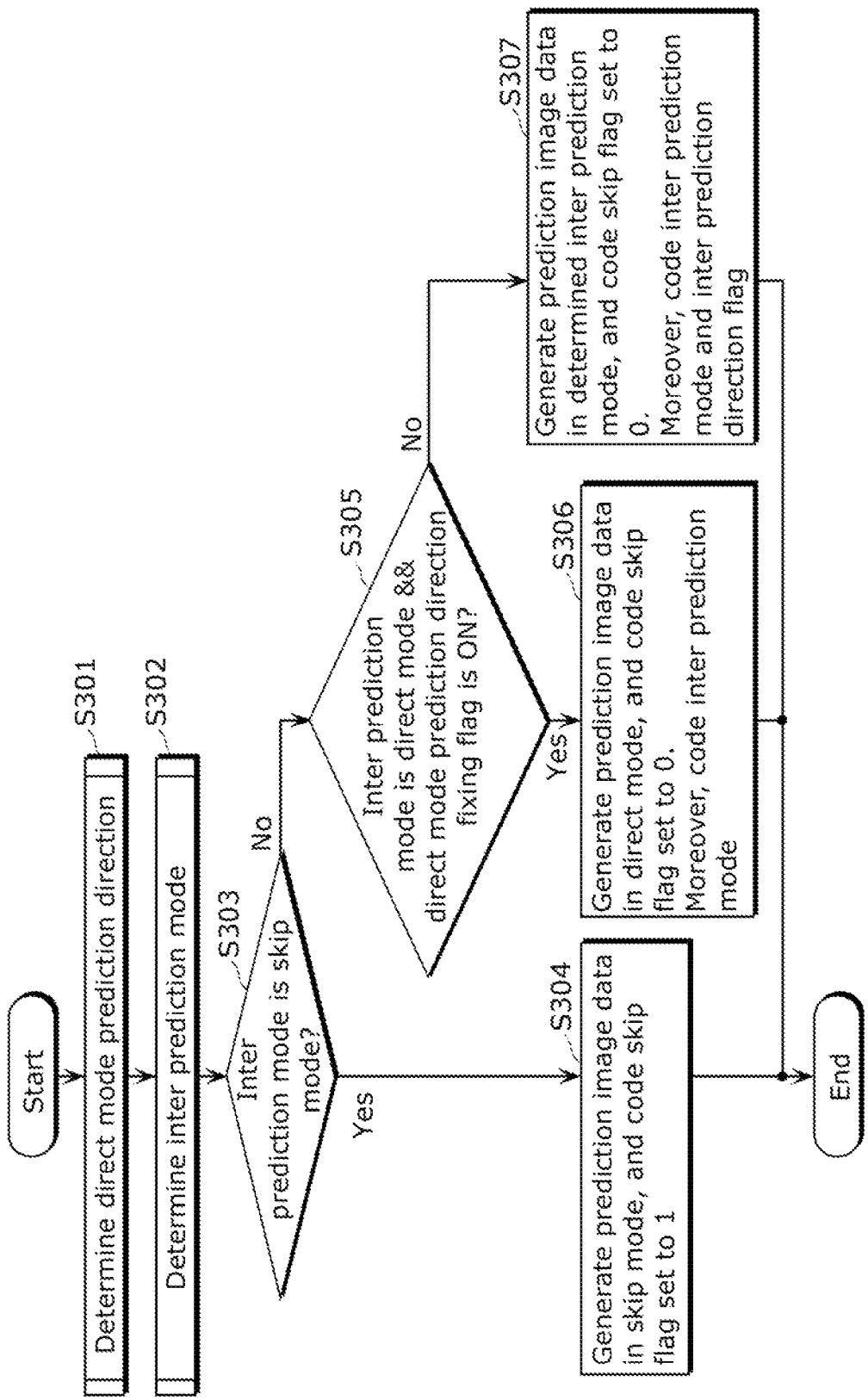
FIG. 3 is a diagram showing an outline of process flow of the moving picture coding method performed by the moving picture coding apparatus according to Embodiment 1 of the present invention.

FIG. 3 is a diagram showing an outline of a process flow of the moving picture coding method performed by the moving picture coding apparatus according to Embodiment 1 of the present invention.

In Step S301, the prediction direction when the current block is coded in a direct mode is determined.

In Step S302, a more efficient inter prediction mode is determined by cost comparison among a motion vector estimation mode in which a prediction image is generated using the motion vector based on the motion estimation result, a direct mode in which a prediction image is generated using the motion vector predictor generated from the neighboring blocks and the like, and a skip mode in which a prediction image is generated using the motion vector predictor generated according to the prediction direction determined in Step S301. A cost calculation method will be described later.

In Step S303, it is determined whether or not the inter prediction mode determined in Step S302 is a skip mode. When the determination result of Step S303 is true (Yes in S303), in Step S304, the prediction image is generated in a skip mode, and a skip flag set to 1 is added into the bitstream of the current block. When the determination result of Step S303 is false (No in S303), it is determined in Step S305 whether or not the determined inter prediction mode is a direct mode and the direct prediction direction fixing flag determined in a method to be described later is ON.

When the determination result of Step S305 is true (Yes in S305), in Step S306, the bi-directional prediction image is generated in a direct mode, and a skip flag set to 0 is added into the bitstream of the current block. Moreover, the inter prediction mode indicating whether it is motion vector estimation mode or the direct mode is added into a bitstream of the current block.

When the determination result of Step S305 is false (No in S305), inter prediction is performed according to the determined inter prediction mode in Step S307, and prediction image data is generated and a skip flat set to zero is added into the bitstream of the current block. Moreover, the inter prediction mode and the inter prediction direction flag are added into the bitstream of the current block. The inter prediction mode indicates whether it is the motion vector estimation mode or the direct mode. The inter prediction direction flag indicates (i) unidirectional prediction in the prediction direction 1, (ii) unidirectional prediction in the prediction direction 2, or (iii) bi-directional prediction in the prediction direction 1 and the prediction direction 2.

Figure 4:
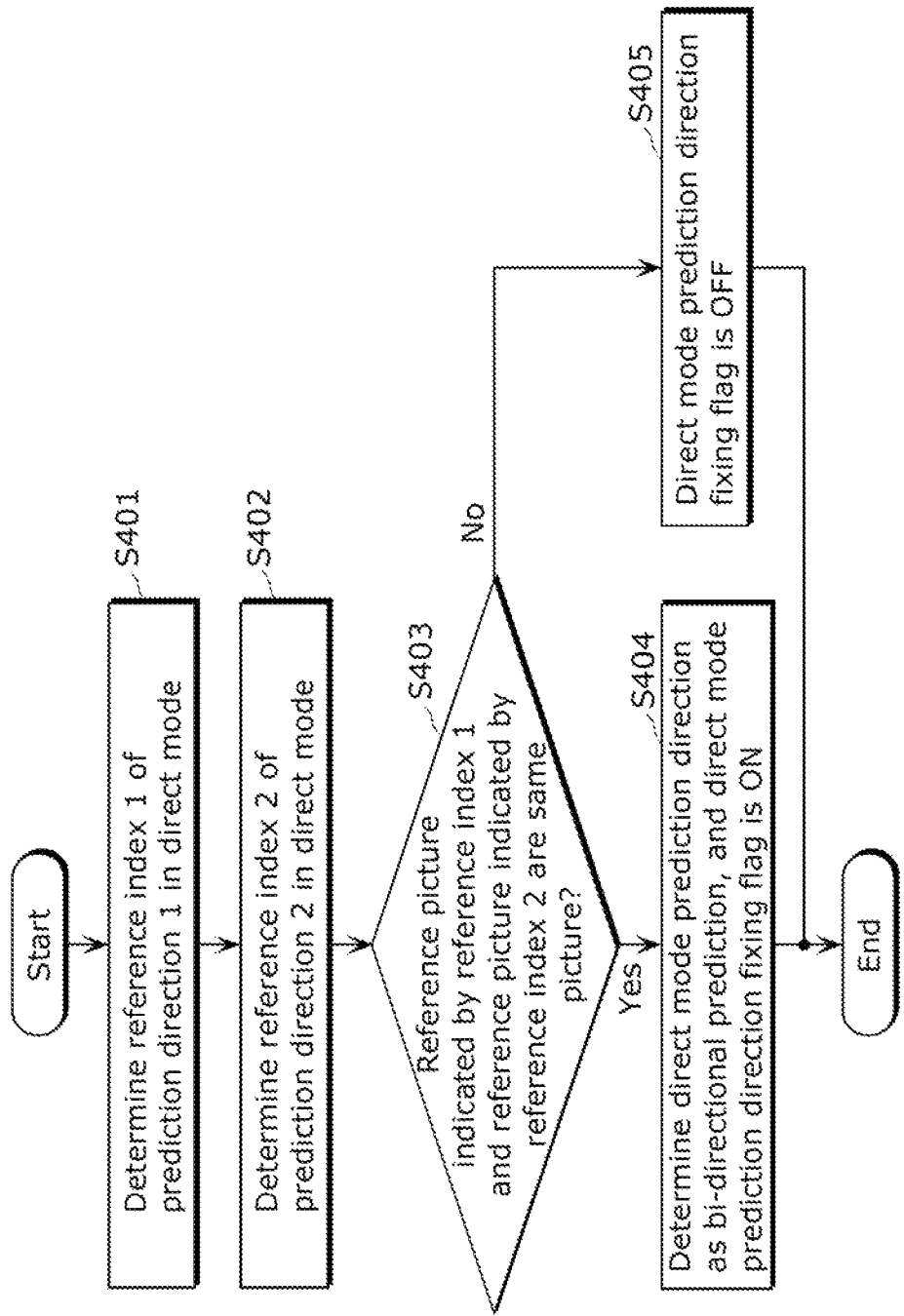
FIG. 4 is a diagram showing a determination flow of a direct mode prediction direction in a direct mode prediction direction determination unit.

FIG. 4 is a diagram showing a determination flow of a direct mode prediction direction in a direct mode prediction direction determination unit. Generally, when the reference picture identified by the reference index 1 in the prediction direction 1 and the reference picture identified by the reference index 2 in the prediction direction 2 are the same with each other, the cost of the bi-directional prediction and the cost of the uni-directional prediction tend to be relatively close to each other. Therefore, by being fixed to one of the prediction directions, it is not necessary to add the inter prediction direction flag into the bitstream for each current block. In the present embodiment, description will be made using an example of the case of being fixed to a bi-directional prediction which can generate a prediction image with relatively little noise due to arithmetic mean. It is to be noted that the image having little influence of noise may be fixed to a uni-directional prediction in terms of the processing amount.

In Step S401, the value of the reference picture index 1 in the direct mode is determined. For example, the reference picture index 1 with the value 0 may be always used in the direct mode.

In Step S402, the value of the reference picture index 2 of the prediction direction 2 in the direct mode is determined. For example, the reference picture index 2 with the value 0 may be always used in the direct mode.

In Step S403, it is determined whether or not the reference picture identified by the value of the reference picture index 1 and the reference picture identified by the value of the reference picture index 2 are the same with each other, sing the reference picture lists 1 and 2. For example, the display order of the reference picture that is identified by the reference picture index 1 and is obtained from the reference picture list 1 is compared with the display order of the reference picture that is identified by the reference picture index 2 and is obtained from the reference picture list 2. When the two display orders have the same value, it can be determined that they are the same picture.

When the reference picture in the prediction direction 1 and the reference picture in the prediction direction 2 are the same picture (Yes in S403), it is determined in Step S404 that the direct mode prediction direction is bi-directional prediction and the direct mode prediction direction fixing flag is set to ON. In other words, when the determination result of Step S403 is true, the direct mode prediction direction is fixed. Here, when the determination result of Step S403 is true, the direct mode prediction direction is set to bi-directional prediction.

Meanwhile, when the reference picture in the prediction direction 1 and the reference picture in the prediction direction 2 are not the same picture (No in S403), in Step S405, the direct mode prediction direction fixing flag is set to OFF. In other words, when the determination result of Step S403 is false, the direct mode prediction direction is not fixed.

It to be noted that although in the present embodiment, the value 0 is always used as the value of the reference picture index in the direct mode, the minimum value of the reference picture index value of the neighboring block and the like may be used. Moreover, although in the present embodiment, it is determined in Step S403 whether or not they are the same picture, using the display order, the coding order and the like may be used for determination.

Figure 5:
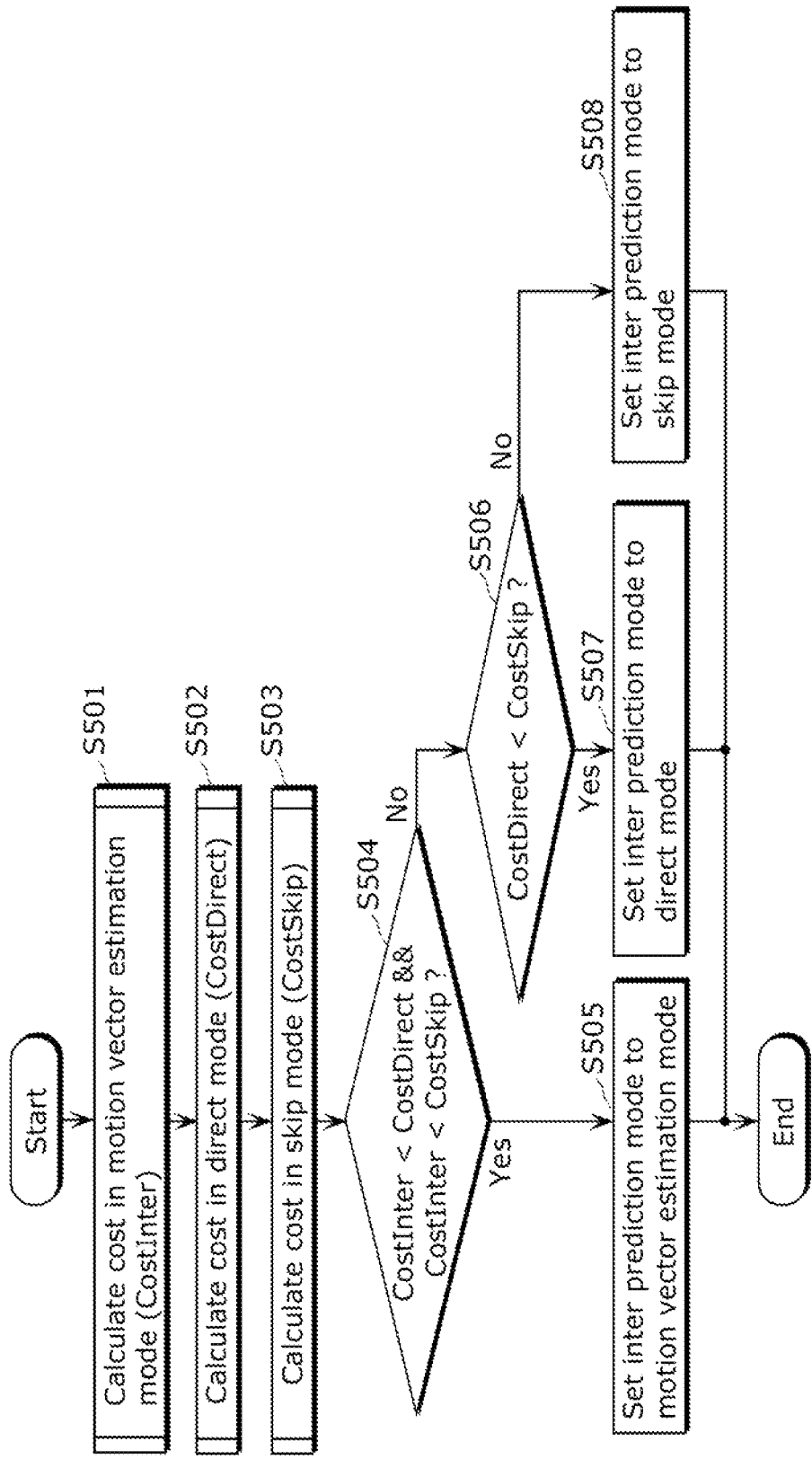
FIG. 5 is a diagram showing a determination flow in inter prediction mode in an inter prediction control unit.

FIG. 5 is a diagram showing a determination flow in inter prediction mode in the inter prediction control unit.

In Step S501, cost CostInter in a motion vector estimation mode in which a prediction image is generated using a motion vector from the motion estimation result is calculated with a method to be described later.

In Step S502, cost CostDirect in a direct mode in which a prediction vector is generated using a motion vector of neighboring blocks and the like and a prediction image is generated using a prediction vector is calculated with a method to be described later.

In Step S503, cost CostSkip in a skip mode in which a prediction image is generated according to the determined skip mode prediction direction flag is calculated with a method to be described later.

In Step S504, a comparison is made among CostInter, CostDirect, and CostSkip.

When CostInter is the smallest (Yes in S504), the inter prediction mode is determined as the motion vector estimation mode in Step S505, and the inter prediction mode is set to the motion vector estimation mode. Meanwhile, when CostInter is not the smallest (No in S504), a comparison is made between CostDirect and CostSkip in Step S506.

When CostDirect is smaller than CostSkip (Yes in S506), the inter prediction mode, is determined as the direct mode in Step S507, and the inter prediction mode is set to the direct mode. Meanwhile, when CostDirect is smaller than CostSkip (No in S506), the inter prediction mode is set to the skip mode in Step S508, and the skip mode is set to the inter prediction mode.

Figure 6:
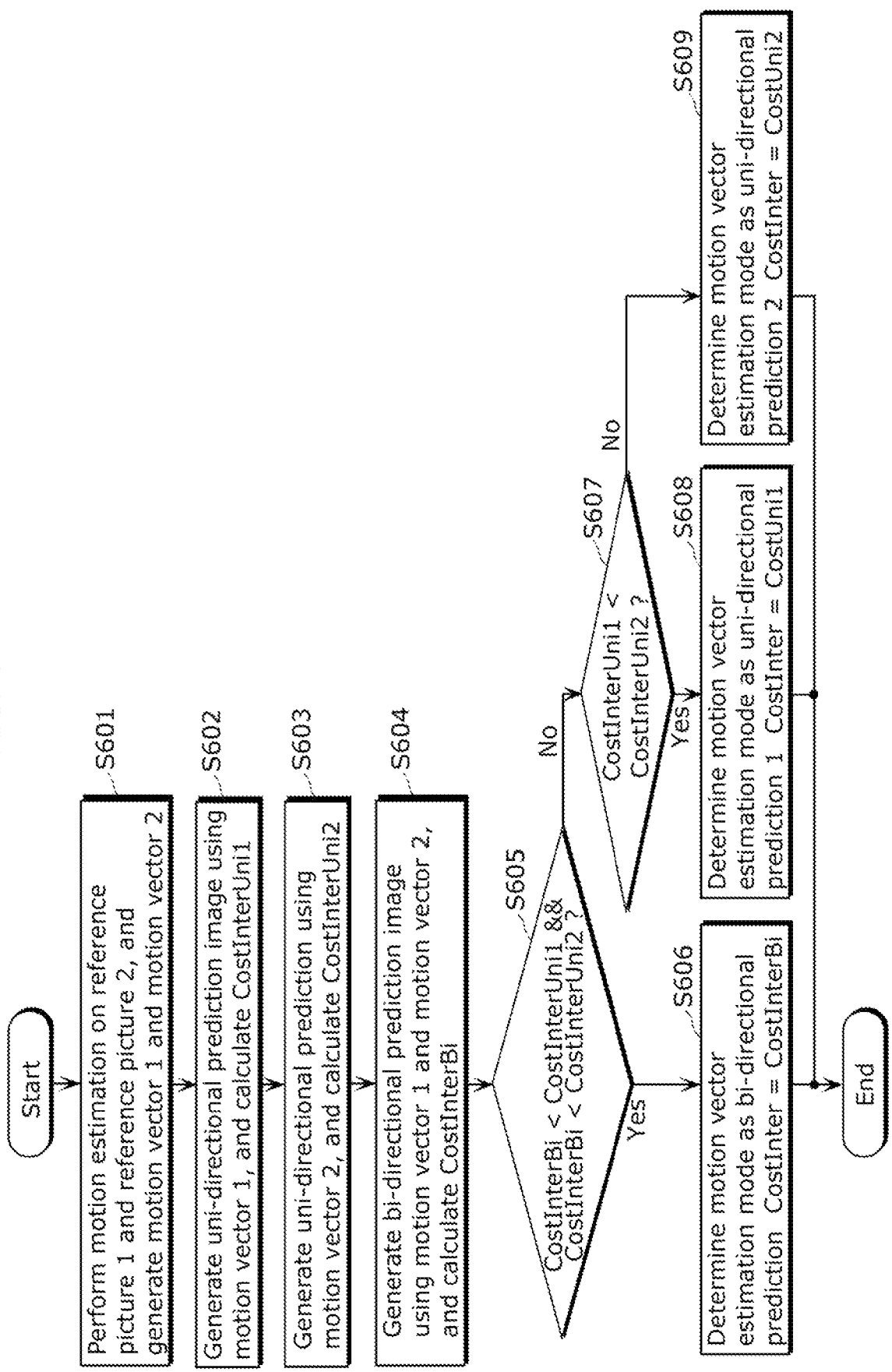
FIG. 6 is a diagram showing a calculation flow of CostInter in the inter prediction control unit.

Next, a method for calculating CostInter in Step S501 in FIG. 5 will be described in detail with reference to the process flow in FIG. 6. FIG. 6 is a diagram showing a calculation flow of CostInter in the inter prediction control unit.

In Step S601, motion estimation is performed on the reference picture 1 identified by the reference picture index 1 in the prediction direction 1 and the reference picture 2 identified by the reference picture index 2 in the prediction direction 2, and a motion vector 1 and a motion vector 2 are generated for the reference picture 1 and the reference picture 2, respectively. In the motion estimation, the difference value between (i) the current block in the picture to be coded and (ii) each of the blocks in the reference picture is calculated, and it is determined that the block in the reference picture having the smallest difference value is the reference block. Then, a motion vector is determined from the location of the current block and the location of the reference block.

In Step S602, the prediction image in the prediction direction 1 is generated using the motion vector 1 obtained in Step S601, and the cost CostInterUni1 is calculated with the following expression 1 of the R-D optimization model.

[Math. 1]

$$\text{Cost} = D + \lambda \times R \quad \text{(Expression 1)}$$

In Expression 1, D represents a coding distortion which is, for example, a sum of absolute difference between (a) pixel values obtained by coding and decoding the current block by using a prediction image generated by a certain motion vector and (b) original pixel values in the current block. Furthermore, R represents a coding amount which is, for example, a coding amount required to code the motion vector used in generating the prediction image. λ represents a Lagrange's method of undetermined multipliers.

In Step S603, the prediction image in the prediction direction 2 is generated using the motion vector 2 obtained in Step S601, and CostInterUni2 is calculated from Expression 1 as similarly to the calculation of CostInterUni1.

In Step S604, a bi-directional prediction image is generated using the motion vector 1 and the motion vector 2 that are obtained in Step S601, and CostInterBi is calculated from Expression 1. Here, the bi-directional prediction image is, for example, an image obtained by arithmetic mean of the prediction image obtained from the motion vector 1 and the prediction image obtained from the motion vector 2 for each of the pixels.

In Step S605, a comparison is made among the values of CostInterUni1, CostInterUni2 and CostInterBi.

When CostInterBi is the smallest (Yes in S605), the prediction direction of the motion vector estimation mode is determined as bi-directional prediction in Step S606, and CostInterBi is set to CostInter. Meanwhile, when CostInterBi is not the smallest (No in S605), a comparison is made in Step S607 between CostInterUni1 and CostInterUni2.

When the value of CostInter1 is smaller than the value of CostInterUni2 (Yes in S607), the motion vector estimation mode is determined as a uni-directional prediction in the prediction direction 1 in Step S608, and CostInterUni1 is set to CostInter. When the value of CostInter1 is smaller than the value of CostInterUni2 (No in S607), the motion vector estimation mode is determined as a uni-directional prediction in the prediction direction 2 in Step S609, and CostInterUni2 is set to CostInter.

It is to be noted that although in the present embodiment, arithmetic mean for each of the pixels is used when the bi-directional prediction image is generated, weighted arithmetic mean and the like may be performed.

Figure 7:
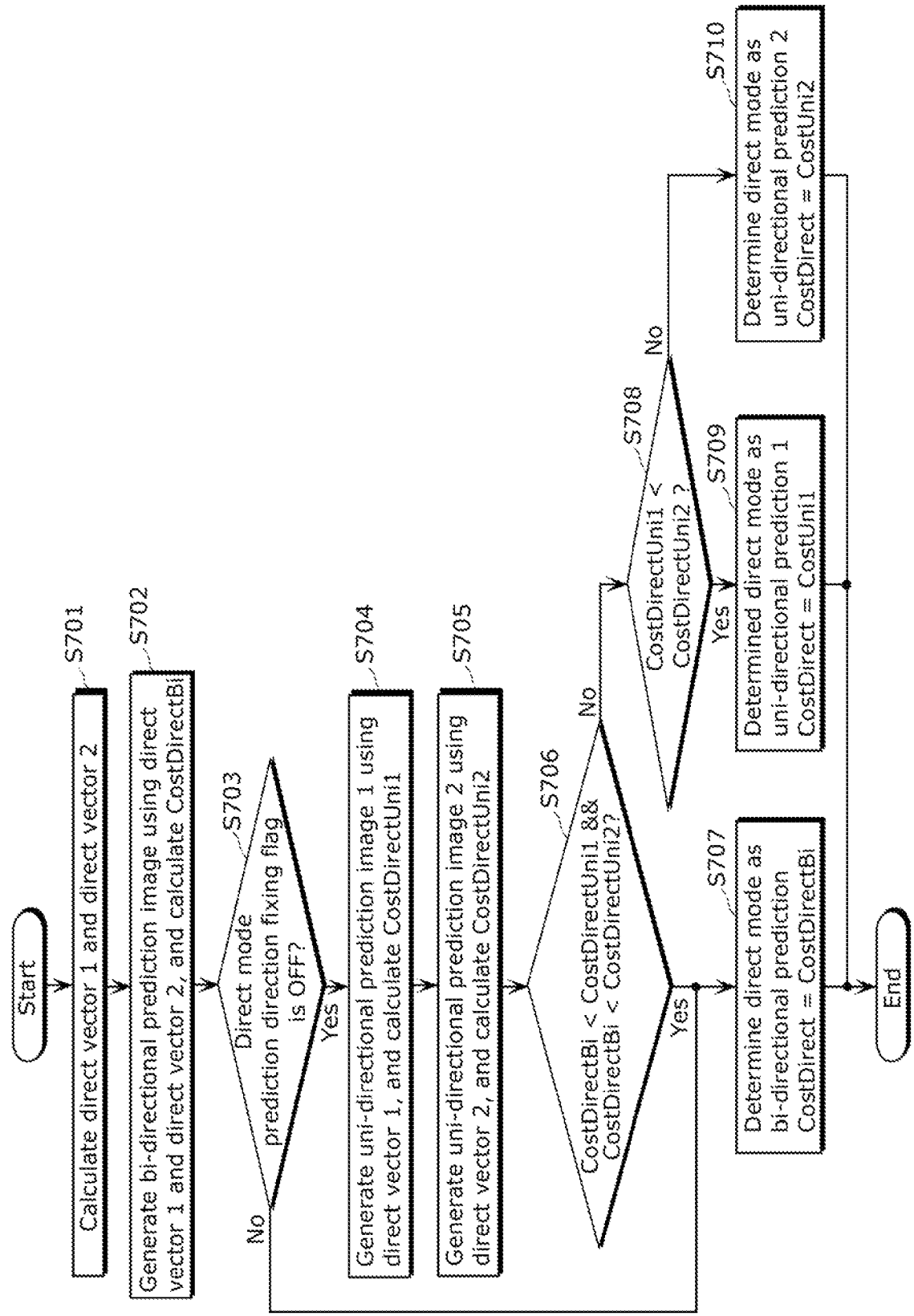
FIG. 7 is a diagram showing a calculation flow of Cost-Direct in the inter prediction control unit.

Next, a method for calculating CostDirect its Step S502 in FIG. 5 will be described in detail with reference to the process flow in FIG. 7. FIG. 7 is a diagram showing a calculation flow of CostDirect in the inter prediction control unit.

Figure 8:
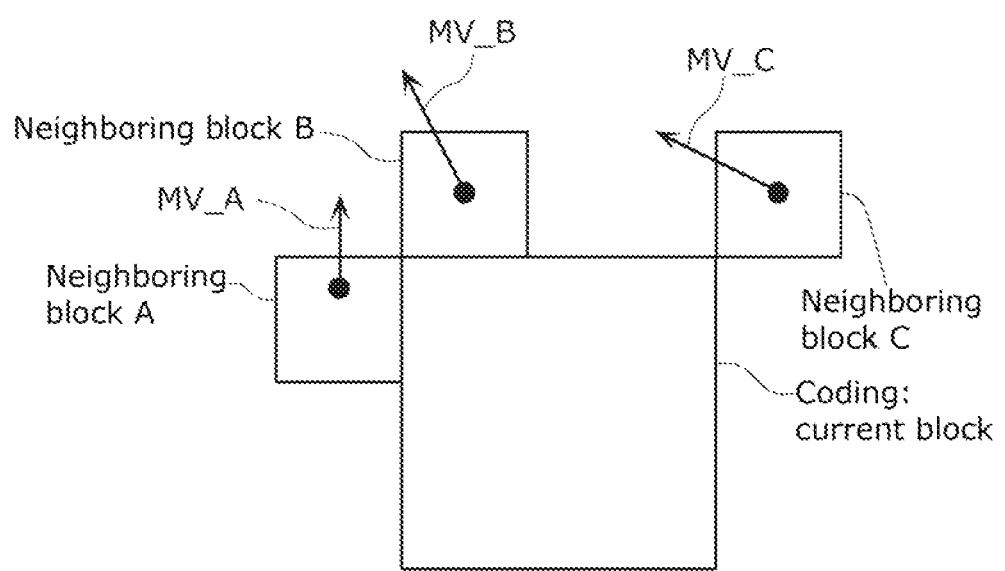
FIG. 8 is a diagram for describing an example a direct vector calculation method.

In Step S701, a direct vector 1 in the prediction direction 1 and a direct vector 2 in the prediction direction 2 are calculated. The direct vector is calculated using the motion vector of the neighboring block, for example. The example will be described with reference to FIG. 8. In FIG. 8, a motion vector MV_A is a motion vector of a neighboring block A on the left neighboring of the current block. Moreover, a motion vector MV_B is a motion vector of a neighboring block B on the top neighboring of the current block. Moreover, a motion vector MV_C is a motion vector of a neighboring block C on the top right neighboring of the current block. The direct vector is for example, calculated from Median (MV_A, MV_B, M_VC) of MV_A, MV_B, and MV_C that are vectors of the neighboring blocks. Here, the median is calculated as follows.

[Math. 2]

$$\text{Median}(x, y, z) = \quad \text{(Expression 2)}$$
$$x + y + z - \text{Min}(x, \text{Min}(y, z)) - \text{Max}(x, \text{Max}(y, z))$$

[Math. 3]

$$\text{Min}(x, y) = \begin{cases} x & (x \leq y) \\ y & (x > y) \end{cases} \quad \text{(Expression 3)}$$

[Math. 4]

$$\text{Max}(x, y) = \begin{cases} x & (x \geq y) \\ y & (x < y) \end{cases} \quad \text{(Expression 4)}$$

The direct vector 1 in the prediction direction 1 is calculated from Expression 2, using the motion vector in the prediction direction 1 of the neighboring block. Moreover, the direct vector 2 in the prediction direction 2 is calculated from Expression 2, using the motion vector in the prediction direction 2 of the neighboring block. It is to be noted that if there is no neighboring block having the same prediction direction as the prediction direction of the current block, the motion vector with the value 0 may be used as the direct vector.

In Step S702, a bi-directional prediction image is generated using the direct vector 1 and the direct vector 2 that are obtained by Step S701, and CostDirectBi is calculated from Expression 1. Here, the bi-directional prediction image is, for example, determined as an image obtained by arithmetic mean of the prediction image obtained from the motion vector 1 and the prediction image obtained from the motion vector 2 for each of the pixels.

In Step S703, it is determined whether or not the direct mode prediction direction flag is OFF.

When the direct mode prediction direction flag is OFF (Yes in S703), a prediction image in the prediction direction 1 is generated using the direct vector 1 and the cost CostDirectUni1 is calculated from Expression 1 in Step S704. Next, in Step S705, a prediction image in the prediction direction 2 is generated using the direct vector 2 obtained in Step S701, and CostDirectUni2 is calculated from Expression 1. Then, in Step S706, a comparison is made among the values of CostDirectUni1, CostDirectUni2, and CostDirectBi.

Meanwhile, when the direct mode prediction direction flag is ON (No in S703) or when CostDirectBi is the smallest (Yes in S706), the direct mode prediction direction is determined as bi-directional prediction, and CostDirectBi is set to CostDirect in Step S707.

Moreover, when CostDirectBi is not the smallest (No in S706), a comparison is made in Step S708 between CostDirectUni1 and CostDirectUni2.

When the value of CostDirectUni1 is smaller than the value of CostDirectUni2 (Yes in S708), the direct mode is determined as a uni-directional prediction 1 in the prediction direction 1, and CostDirectUni1 is set to CostDirect in Step S709. When the value of CostDirectUni1 is not smaller than the value of CostDirectUni2 (No in S708), the direct mode is determined as a uni-directional prediction 2 in the prediction direction 2, and CostDirectUni2 is set to CostDirect in Step S710.

Figure 9:
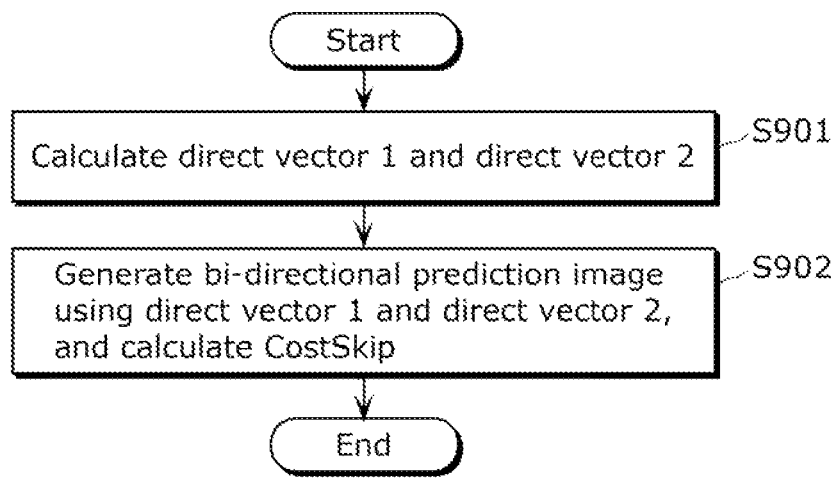
FIG. 9 is a diagram showing a calculation flow of Cost-Skip in the inter prediction control unit.

Next, a method for calculating CostSkip in Step S503 in FIG. 5 will be described in detail with reference to the process flow in FIG. 9. FIG. 9 is a diagram showing a calculation flow of CostSkip in the inter prediction control unit.

In Step S901, a direct vector 1 in the prediction direction 1 and a direct vector 2 in the prediction direction 2 are calculated.

In Step S902, a bi-directional prediction image is generated using the direct vector 1 and the direct vector 2, and CostSkip is calculated from Expression 1. Here, the bi-directional prediction image is, for example, determined as an image obtained by arithmetic mean of the prediction image obtained from the motion vector 1 and the prediction image obtained from the motion vector 2 for each of the pixels.

As described above, in the present embodiment, when the direct mode prediction direction is determined, independently of the prediction directions of the surrounding blocks, it is possible to increase the quality of the direct mode prediction image and the coding efficiency by selecting the best prediction direction for the current block and adding it into a bitstream.

Moreover, since the cost of bi-directional prediction and to the cost of uni-directional prediction tend to be relatively close to each other when the reference picture identified by the reference picture index 1 in the prediction direction 1 and the reference picture identified by the reference picture index 2 in the prediction direction 2 are the same picture, the direct mode prediction direction is fixed to bi-directional prediction in which a prediction image having relatively little noise can be generated. With this, since it is not necessary to always add the direct mode prediction direction flag into each of the current blocks, it is possible to increase coding efficiency by reducing a redundant amount of data.

Embodiment 2

Figure 10:
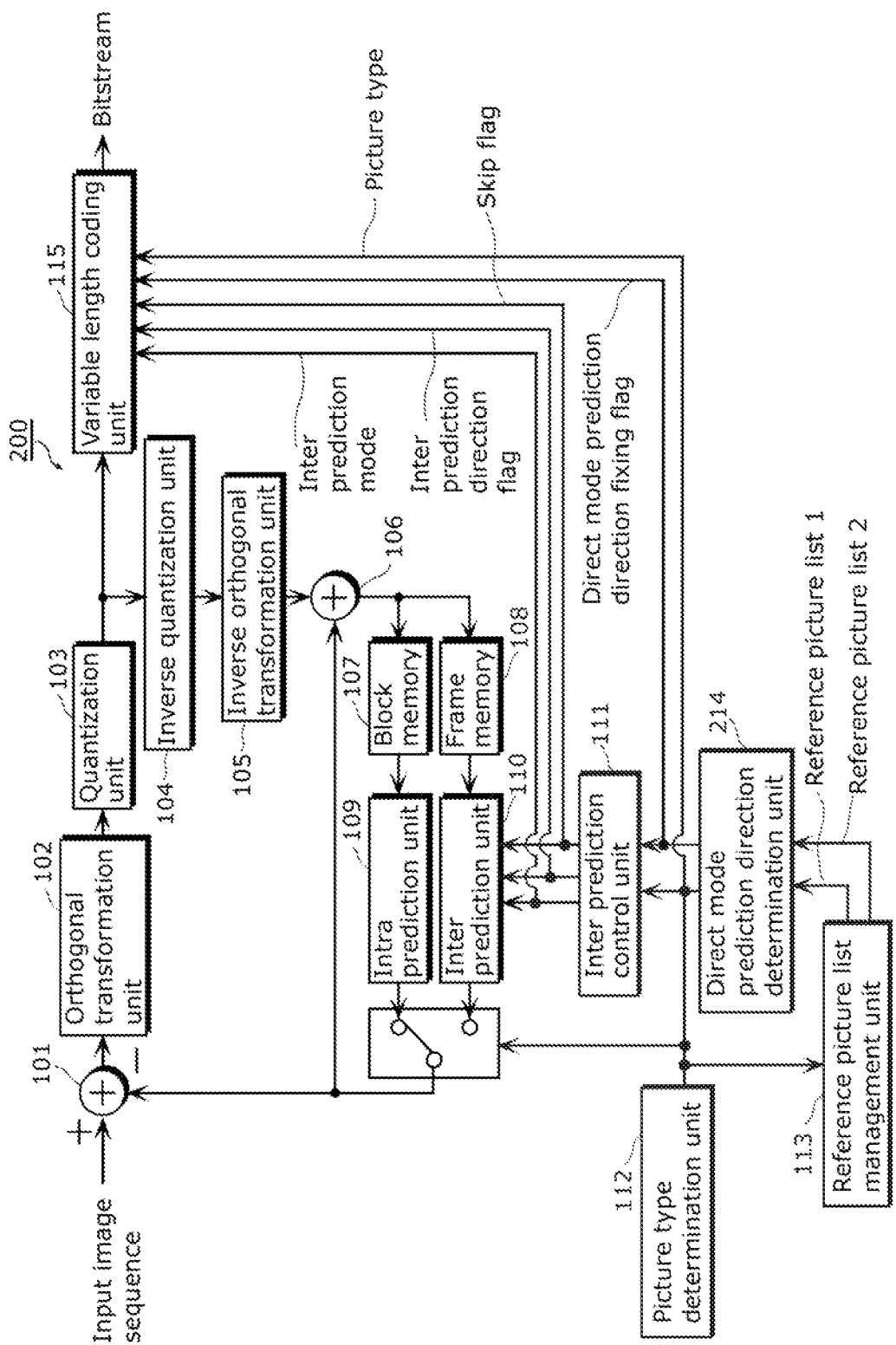
FIG. 10 is a block diagram showing a structure of a moving picture coding apparatus using a moving picture coding method according to Embodiment 2 of the present invention.

FIG. 10 is a block diagram showing a structure of a moving picture coding apparatus using a moving picture coding method according to Embodiment 2 of the present invention. It is to be noted that in FIG. 10, the same reference signs are assigned to the same constituent elements as those shown in FIG. 1, and a description thereof will be omitted.

The difference of a moving picture coding apparatus 200 according to the present embodiment from the moving picture coding apparatus 100 according to Embodiment 1 is that the moving picture coding apparatus 200 adds the direct mode prediction direction fixing flag generated by a direct mode prediction direction determination unit 214 into header data (for example, a picture parameter set or a slice header in H. 264) given to a bitstream for each processing unit such as a picture.

Figure 11:
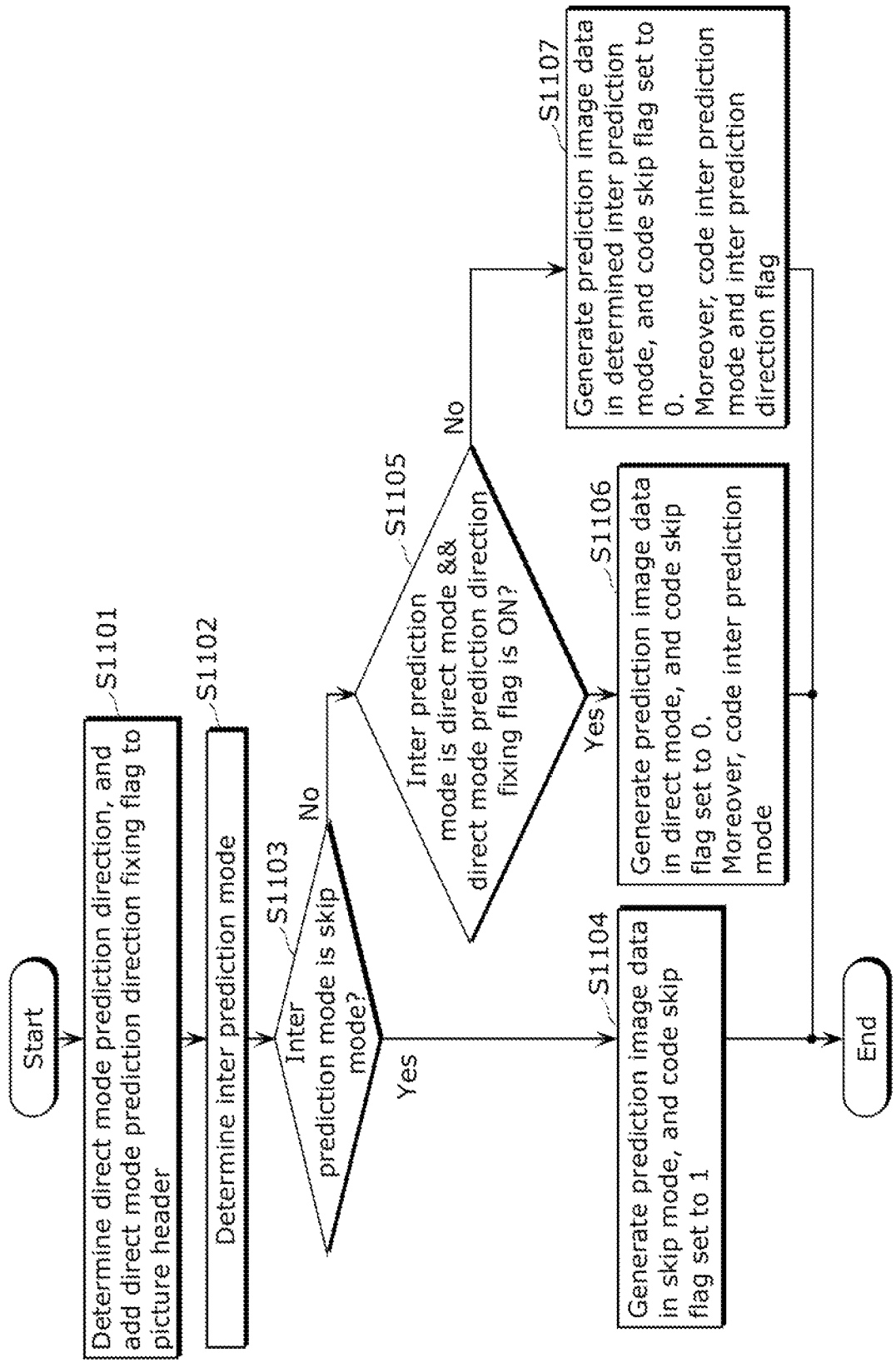
FIG. 11 is a diagram showing an outline of a process flow of the moving picture coding method performed by the moving picture coding apparatus according to Embodiment 2 of the present invention.

FIG. 11 is a diagram showing an outline of a process flow of the moving picture coding method performed by the moving picture coding apparatus according to Embodiment 2 of the present invention.

In Step S1101, the prediction direction when the current block is coded in direct mode is determined, and the determined direct prediction direction fixing flag is added into a picture header and the like. Here, the flow of FIG. 4 in Embodiment 1 can be used as the method for determining the direct mode prediction direction.

In Step S1102, a more efficient inter prediction mode is determined by cost comparison among a motion vector estimation mode in which a prediction image is generated using the motion vector based on the motion estimation result, a direct mode in which a prediction image is generated using the motion vector predictor generated from the neighboring blocks and the like, and a skip mode in which a prediction image is generated using the motion vector predictor generated according to the prediction direction determined in Step S1101. Here, Expression 1 and the like are used as the cost calculation method.

In Step S1103, it is determined whether or not the inter prediction mode determined in Step S1102 is a skip mode. When the determination result of Step S1103 is true (Yes in S1103), in Step S1104, a prediction picture in a skip mode is generated and a skip flag set to 1 is added into the bitstream of the current block. When the determination result of Step S1103 is false (No in S1103), it is determined in Step S1105 whether or not the determined inter prediction mode is a direct mode and the direct prediction direction fixing flag is ON.

When the determination result of Step S1105 is true (Yes in S1105), in Step S1106, a bi-directional prediction picture in a direct mode is generated and a skip mode set to 0 is added into the bitstream of the current block. Moreover, the inter prediction mode indicating whether it is motion vector estimation mode or the direct mode is added into the bitstream of the current block. When the determination result of Step S1105 is false (No in S1105), inter prediction is performed according to the inter prediction mode determined in Step S1107, prediction image data is generated, and a skip mode set to 0 is added into a bitstream of the current block. Moreover, (i) the inter prediction mode indicating whether it is the motion vector estimation mode or the direct mode, and (ii) the inter prediction flag indicating whether the inter prediction direction is bi-directional prediction using uni-directional prediction in the prediction direction 1, un-directional prediction in the prediction direction 2, or bi-directional prediction using the prediction direction 1 and the prediction direction 2 are added into the bitstream of the current block. Furthermore, header data into which a bitstream is added for each processing unit such as a picture is added into the direct mode prediction direction fixing flag.

It is to be noted that the inter prediction mode and the like are those in Embodiment 1, and a description thereof will be omitted.

As described above, since in the present embodiment, the direct mode prediction direction fixing flag is explicitly given to the picture header and the like, it is possible to flexibly switch, between each of the pictures, whether the direct mode prediction direction is fixed to bi-directional prediction. Therefore, it is possible to increase coding efficiency.

Embodiment 3

Figure 12:
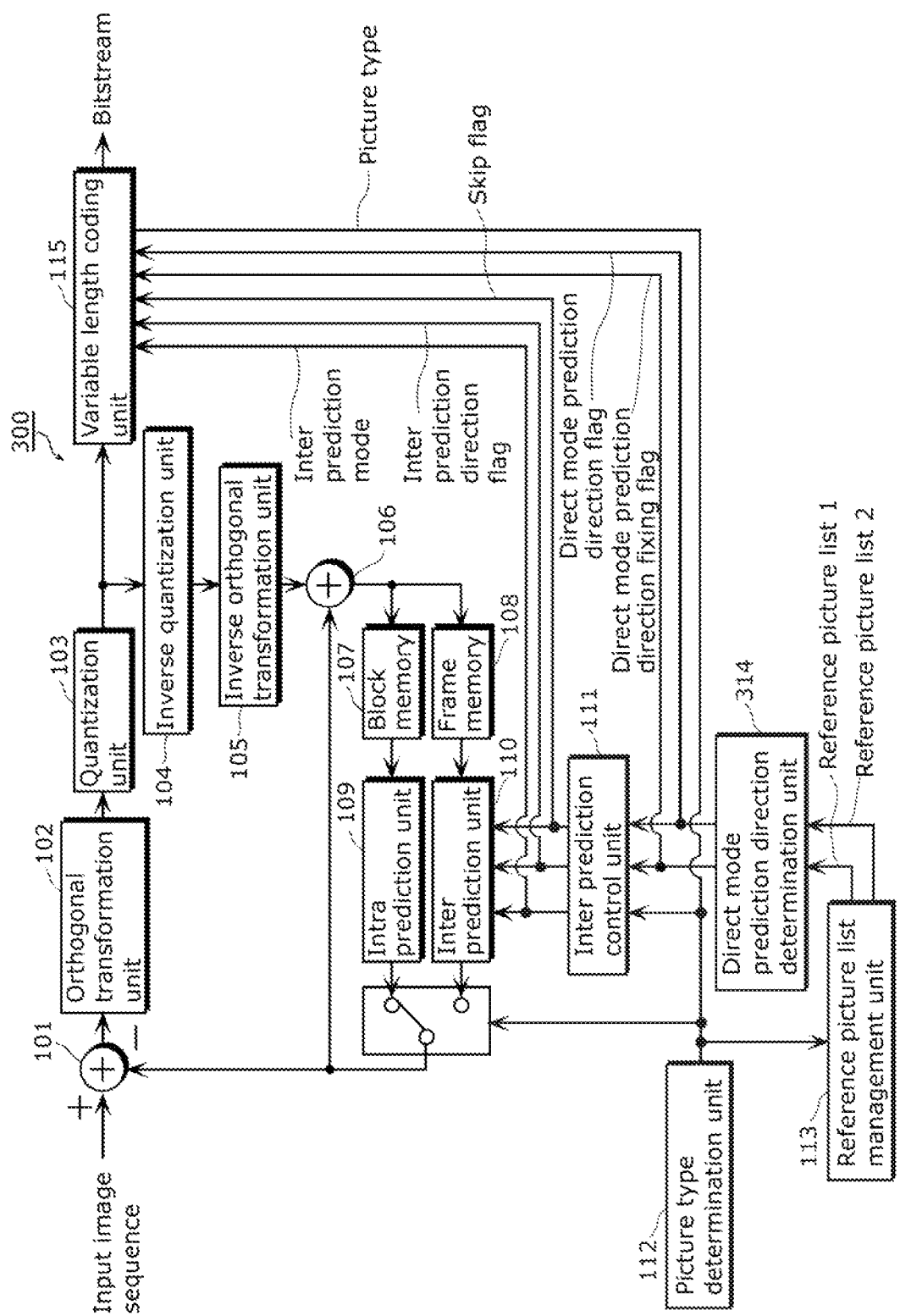
FIG. 12 is a block diagram showing a structure of a moving picture coding apparatus using a moving picture coding method according to Embodiment 3 of the present invention.

FIG. 12 is a block diagram showing a structure of a moving picture coding apparatus using a moving picture coding method according to Embodiment 3 of the present invention. It is to be noted that in FIG. 12, the same reference signs are assigned to the same constituent elements as those shown in FIG. 1, and a description thereof will be omitted.

The difference of a moving picture coding apparatus 300 according to the present embodiment from the moving picture coding apparatus 100 according to Embodiment 1 is that the moving picture coding apparatus 300 causes the direct mode prediction direction flag and the direct mode prediction direction fixing flag generated by a direct mode prediction direction determination unit 314 to add header data into a bitstream for each processing unit such as a picture (for example, a picture parameter set or a slice header in H. 264).

Figure 13:
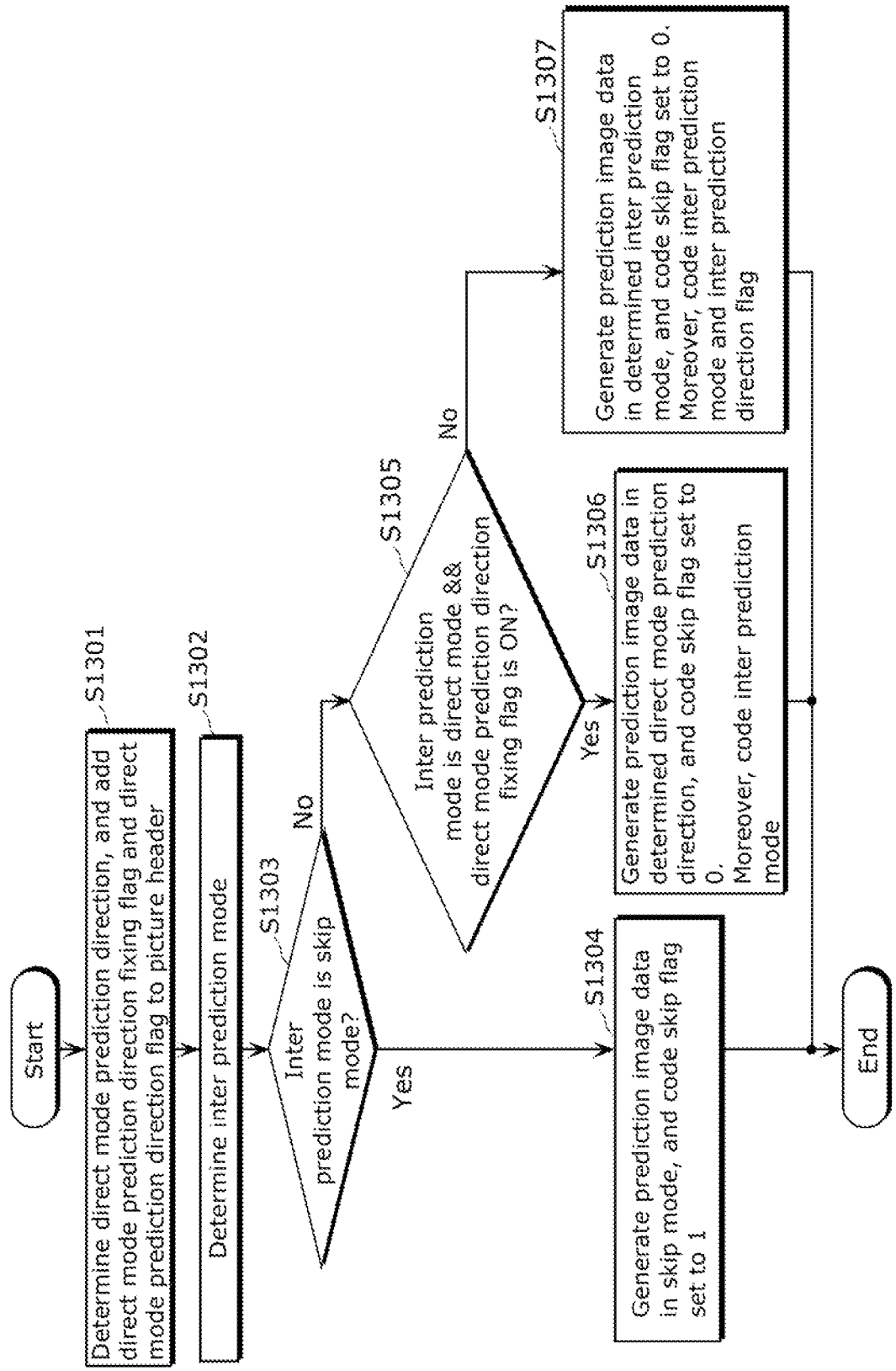
FIG. 13 is a diagram showing an outline of a process flow of the moving picture coding method performed by the moving picture coding apparatus according to Embodiment 3 of the present invention.

FIG. 13 is a diagram showing an outline of a process flow of the moving picture coding method performed by the moving picture coding apparatus according to Embodiment 3 of the present invention.

In Step S1301, the prediction direction when the current block is coded in a direct mode is determined, and the determined direct mode prediction direction fixing flag and the determined direct prediction direction flag are added into a picture header and the like. Here, the flow of FIG. 4 in Embodiment 1 can be used as the method for determining the direct mode prediction direction.

In Step S1302, a more efficient inter prediction mode is determined by cost comparison among a motion vector estimation mode in which a prediction image is generated using the motion vector based on the motion estimation result, a direct mode in which a prediction image is generated using the motion vector predictor generated from the neighboring blocks and the like, and a skip mode in which a prediction image is generated using the motion vector predictor generated according to the prediction direction determined in Step S1301. Here, Expression 1 and the like are used as the cost calculation method.

In Step S1303, it is determined whether or not the inter prediction mode determined in Step S1302 is a skip mode. When the determination result of Step S1303 is true (Yes in S1303), in Step S1304, a prediction picture in a skip mode is generated and a skip flag set to 1 is added into the bitstream of the current block. When the determination result of Step S1303 is false (No in S1303), it is determined in Step S1305 whether (i) the determined inter prediction mode is a direct mode and (ii) the direct prediction direction fixing flag is ON.

When the determination result of Step S1305 is true (Yes in S1305), in Step S1306, a prediction image is generated according to the direct mode prediction direction determined in Step S1301 and a skip flag set to 0 is added into the bitstream of the current block. Moreover, the inter prediction mode indicating whether it is the motion vector estimation mode or the direct mode is added into the bitstream of the current bock.

When the determination result of Step S1305 is false (No in S1305), inter prediction is performed according to the inter prediction mode determined in Step S1307, prediction image data is generated, and a skip flag set to 0 is added into the bitstream of the current block. Moreover, the inter prediction mode and the inter prediction direction flag indicating whether they are the motion vector estimation mode or the direct mode are added into the bitstream of the current block. Furthermore, the direct mode prediction direction flag and the direct mode prediction direction fixing flag are caused to added into header data to which a bitstream is given for each processing unit such as a picture.

It is to be noted that the inter prediction mode determination method and the like are those in Embodiment 1, and a description thereof will be omitted.

As described above, since in the present embodiment, the direct mode prediction direction fixing flag and the direct prediction direction flag are explicitly given to the picture header and the like, it is possible to flexibly switch, between each of the pictures, whether the direct mode prediction direction is fixed to a certain prediction direction. Therefore, it is possible to increase coding efficiency.

Embodiment 4

Figure 14:
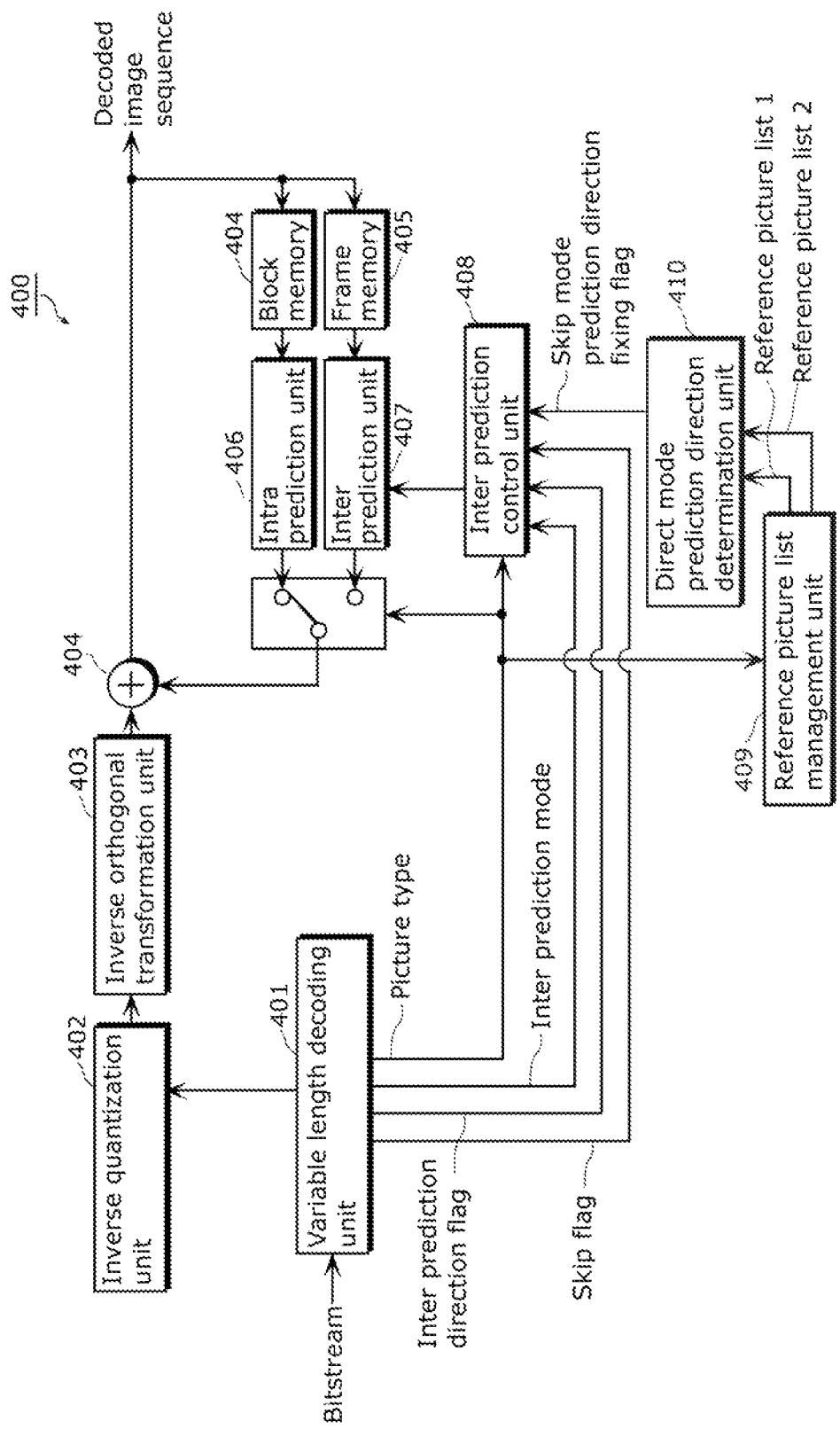
FIG. 14 is a block diagram showing a structure of a moving picture decoding apparatus using a moving picture decoding method according to Embodiment 4 of the present invention.

FIG. 14 is a block diagram showing a structure of a moving picture decoding apparatus using a moving picture decoding method according to Embodiment 4 of the present invention.

A moving picture decoding apparatus 400, as shown in FIG. 14, includes a variable length decoding unit 401, an inverse quantization unit 402, an inverse orthogonal transformation unit 403, a block memory 404, a frame memory 405, an intra prediction unit 406, an inter prediction unit 407, an inter prediction control unit 408, a reference picture list management unit 409, a direct mode prediction direction determination unit 410, and an adding unit 411.

The variable length decoding unit 401 generates, by performing variable length decoding process on the input bitstream, picture type information, an inter prediction mode, an inter prediction direction flag, and variable length decoded quantization coefficients. The inverse quantization unit 402 inversely quantizes the variable length decoded quantization coefficients. The inverse orthogonal transformation unit 403 generates prediction residual image data by transforming the inversely quantized orthogonal transform coefficients from a frequency domain to an image domain. The block memory 404 stores, by a block-by-block basis, an image sequence generated by adding the prediction residual image data and the prediction image data. The frame memory 405 stores an image sequence on a frame-by-frame basis. The intra prediction unit 406 generates the prediction image data of the current block to be decoded by performing intra prediction using the image sequence on a block-by-block basis that is stored in the block memory 404. The inter prediction unit 407 generates the prediction image data of the current block by performing inter prediction using an image sequence on a frame-by-frame basis that is stored in the frame memory 405. The inter prediction control unit 408 controls a motion vector and a prediction image data generation method in inter prediction according to an inter prediction mode, an inter prediction direction, and a skip flag.

The reference picture list management unit 409 assigns a reference picture index to a coded reference picture to be referred in inter prediction, and generates a reference list along with a display order and the like (as similarly to the reference picture list management unit 113 in FIG. 2 in Embodiment 1). Since the reference picture list management unit 409, in a B-picture, can perform coding with reference to two pictures, the reference picture list management unit 409 stores two reference lists.

It is to be noted that in the present embodiment, the reference pictures are managed with the reference picture indexes and display order. However, the reference pictures may be managed with the reference picture indexes, display order and the like.

The direct mode prediction direction determination unit 410 determines the direct mode prediction direction of the current block to be coded in the following method and sets the direct mode prediction direction fixing flag, using the reference picture lists 1 and 2 generated by the reference picture list management unit 409. It is to be noted that since a determination flow of the direct mode prediction direction fixing flag is the same as that of FIG. 4 in Embodiment 1, a description thereof will be omitted.

Finally, the adding unit 411 generates a decoded image sequence by adding the decoded prediction residual mage data and the prediction image data.

Figure 15:
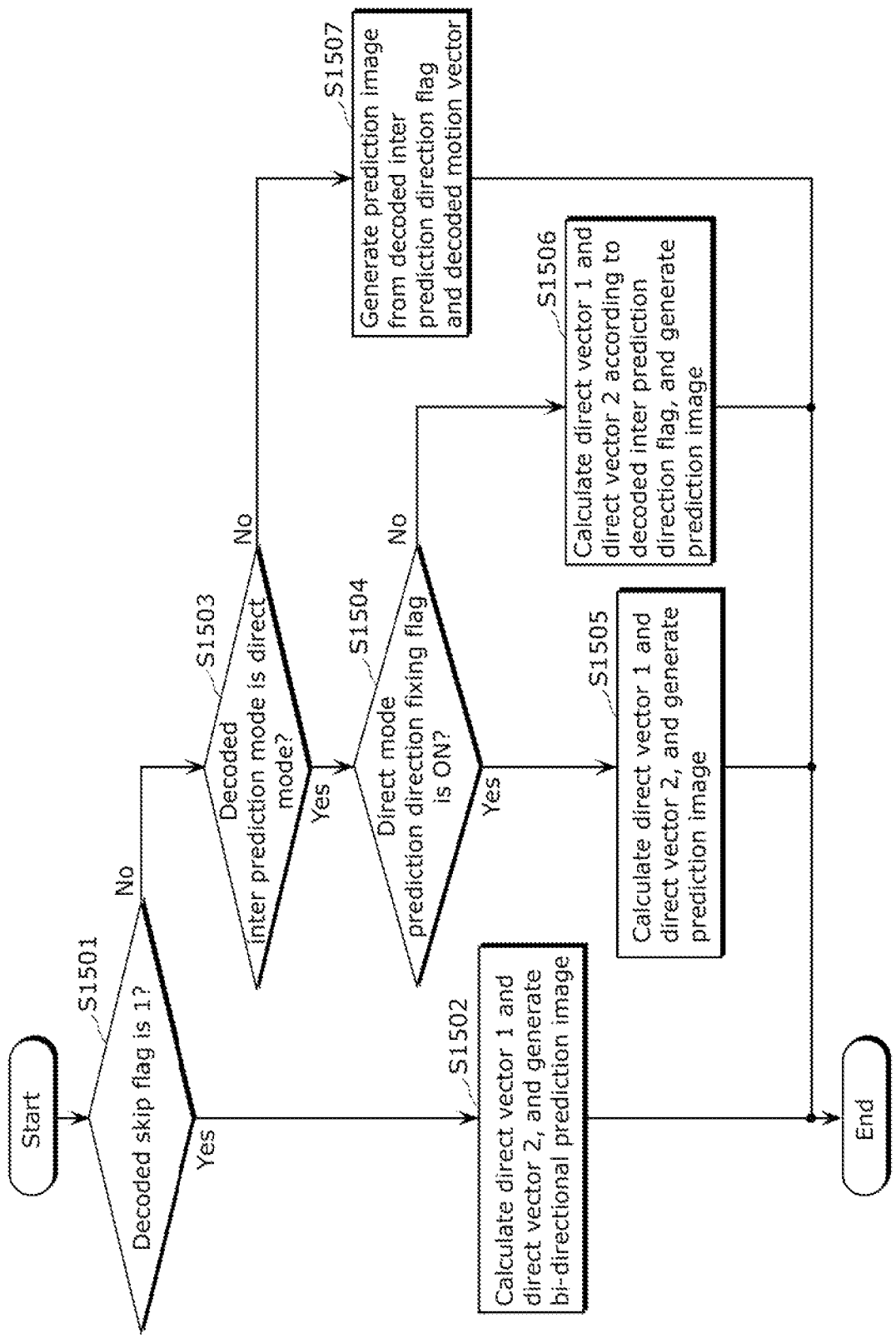
FIG. 15 is a diagram showing an outline of a process flow of the moving picture decoding method performed by the moving picture decoding apparatus according to Embodiment 4 of the present invention.

FIG. 15 is a diagram showing an outline of a process flow of the moving picture decoding method performed by the moving picture decoding apparatus according to Embodiment 4 of the present invention.

In Step S1501, it is determined whether or not the skip flag decoded from a bitstream is 1. When the skip flag is 1 (Yes in S1501), the direct vector 1 and the direct vector 2 are calculated and bi-directional prediction image is generated in Step S1502. When the skip flag is not 1 (No in S1501), in other words, when it is not a skip mode, it is determined whether or not the decoded prediction mode is a direct mode in Step S1503.

When the prediction mode is a direct mode (Yes in S1503), it is determined whether or not the direct mode prediction direction fixing flag is ON in Step S1504. When the direct mode prediction direction fixing flag is ON (Yes in S1504), the direct vector 1 and the direct vector 2 are calculated and bi-directional prediction image is generated in Step S1505. When the direct mode prediction direction fixing flag is OFF (No in S1504), the direct vector 1 and the direct vector 2 are calculated according to the decoded inter prediction direction and a prediction image is generated in Step S1506.

Meanwhile, when the prediction mode is not a direct mode (No in S1503), in other words, when the prediction mode is a motion vector estimation mode, a prediction image is generated using the decoded inter prediction direction flag and the decoded motion vector in Step S1507.

It is to be noted that in the present embodiment, when the direct mode prediction direction fixing flag is ON in Step S1505, a bi-directional prediction image is generated. However, a unidirectional image, for example, may be generated corresponding to the coding method.

FIG. 16 is an example of a syntax of a bitstream in the moving picture decoding method according to Embodiment 4 of the present invention. In FIG. 16, skip_flag indicates a skip flag, pred_mode indicates an inter prediction mode, and inter_pred_idc indicates an inter prediction direction flag.

As described above, in the present embodiment, when the direct mode prediction direction is determined, independently of the prediction directions of the surrounding blocks, it is possible to appropriately decode a bitstream with higher coding efficiency by selecting, the best prediction direction for the current block and adding into the bitstream.

Moreover, when the reference picture identified by the reference picture index 1 in the prediction direction 1 and the reference picture identified by the reference picture index 2 in the prediction direction 2 are the same picture, the direct mode prediction direction is fixed to bi-directional prediction and the direct mode prediction direction flag is not added into the bitstream, with the result that a redundant amount of data can be reduced and it is possible to appropriately decode the bitstream with higher coding efficiency.

Embodiment 5

Figure 17:
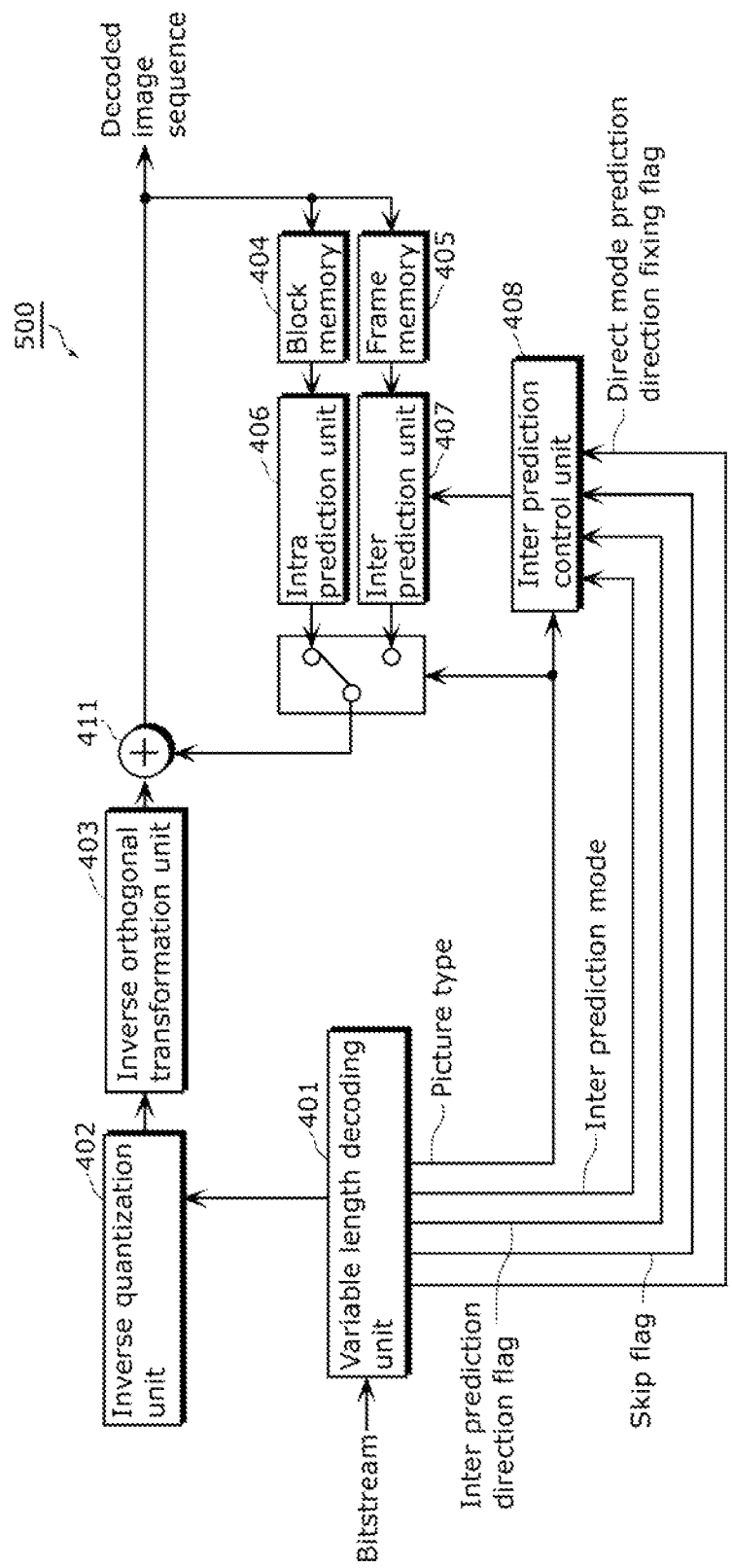
FIG. 17 is a block diagram showing a structure of a moving picture decoding apparatus using a moving picture decoding method according to Embodiment 5 of the present invention.

FIG. 17 is a block diagram showing a structure of a moving picture decoding apparatus using a moving picture decoding method according to Embodiment 5 of the present invention. The difference of a moving picture decoding apparatus 500 according to the present embodiment from the moving picture decoding apparatus 400 according to Embodiment 4 is that the moving picture decoding apparatus 500 can decode a direct mode prediction direction fixing flag included in header data (for example, a picture parameter set or a slice header in H.264) given to a bitstream for each processing unit such as a picture.

Figure 18:
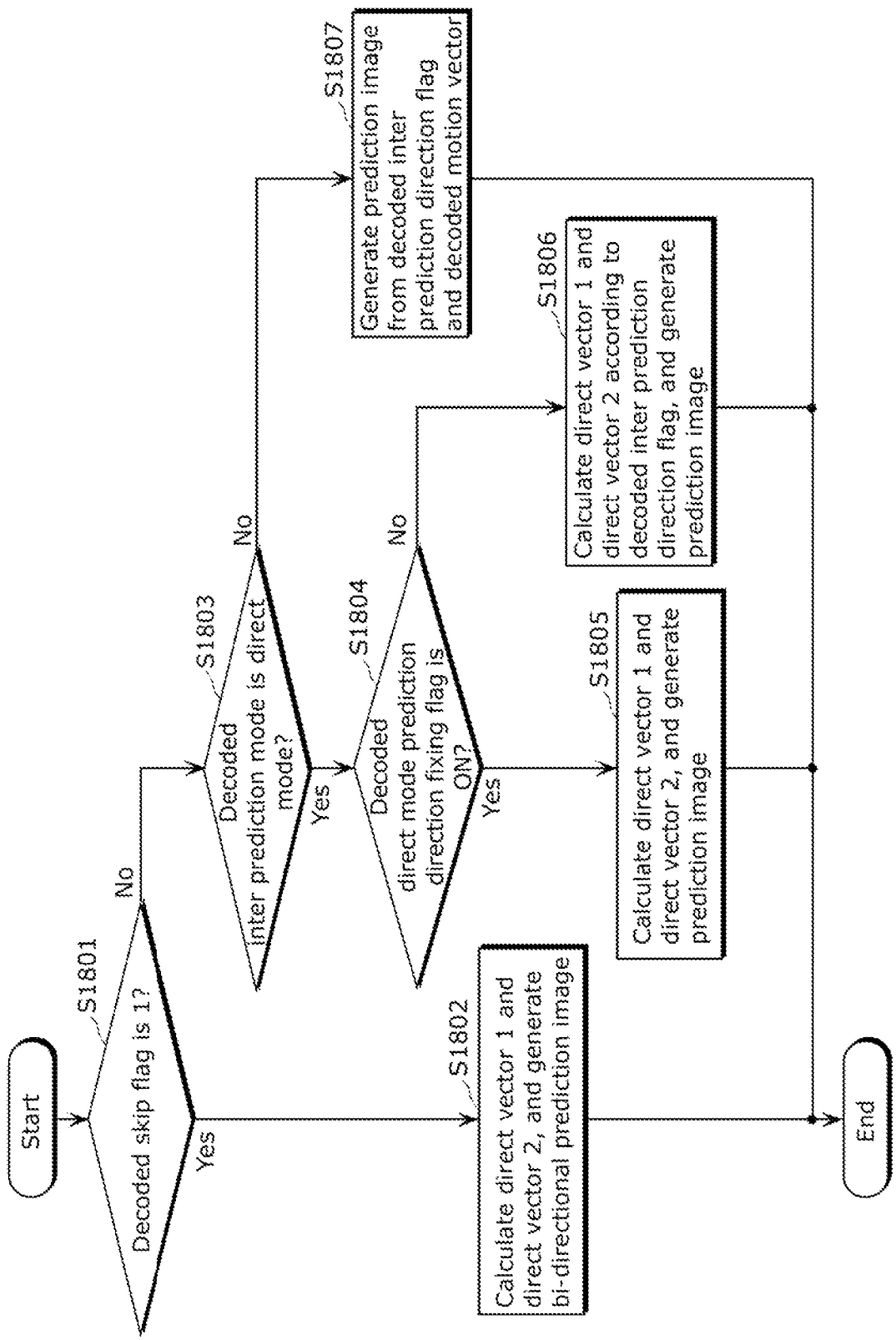
FIG. 18 is a diagram showing an outline of a process flow of the moving picture decoding method according to Embodiment 5 of the present invention.

FIG. 18 is a diagram showing an outline of a process flow of the moving picture decoding method according to Embodiment 5 of the present invention.

In Step S1801, it is determined whether or not the skip flag decoded from a bitstream is 1. When the skip flag is 1 (Yes in S1801), the direct vector 1 and the direct vector 2 are calculated and bi-directional prediction image is generated in Step S1802. When the skip flag is not 1 (No in S1801), in other words, when it is not a skip mode, it is determined whether or not the decoded prediction mode is a direct mode in Step S1803.

When the prediction mode is a direct mode (Yes in S1803), it is determined whether or not the direct mode prediction direction fixing flag decoded from a bitstream is ON in Step S1804. When the direct mode prediction direction fixing flag is ON (Yes in S1804), the direct vector 1 and the direct vector 2 are calculated and a bi-directional prediction image is generated in Step S1805. When the direct mode prediction direction fixing flag is OFF (No in S1804), the direct vector 1 and the direct vector 2 are calculated according to the decoded inter prediction direction flag and a prediction image is generated in Step S1806.

Meanwhile, when the prediction mode is not a direct mode (No in S1803), in other words, when the prediction mode is a motion vector estimation mode, a prediction image is generated using the decoded inter prediction direction flag and the decoded motion vector in Step S1807.

It is to be noted that in the present embodiment, when the direct mode prediction direction fixing flag is ON in Step S1805, a bi-directional prediction image is generated. However, a uni-directional image, for example, may be generated corresponding to the coding method.

Figure 19:
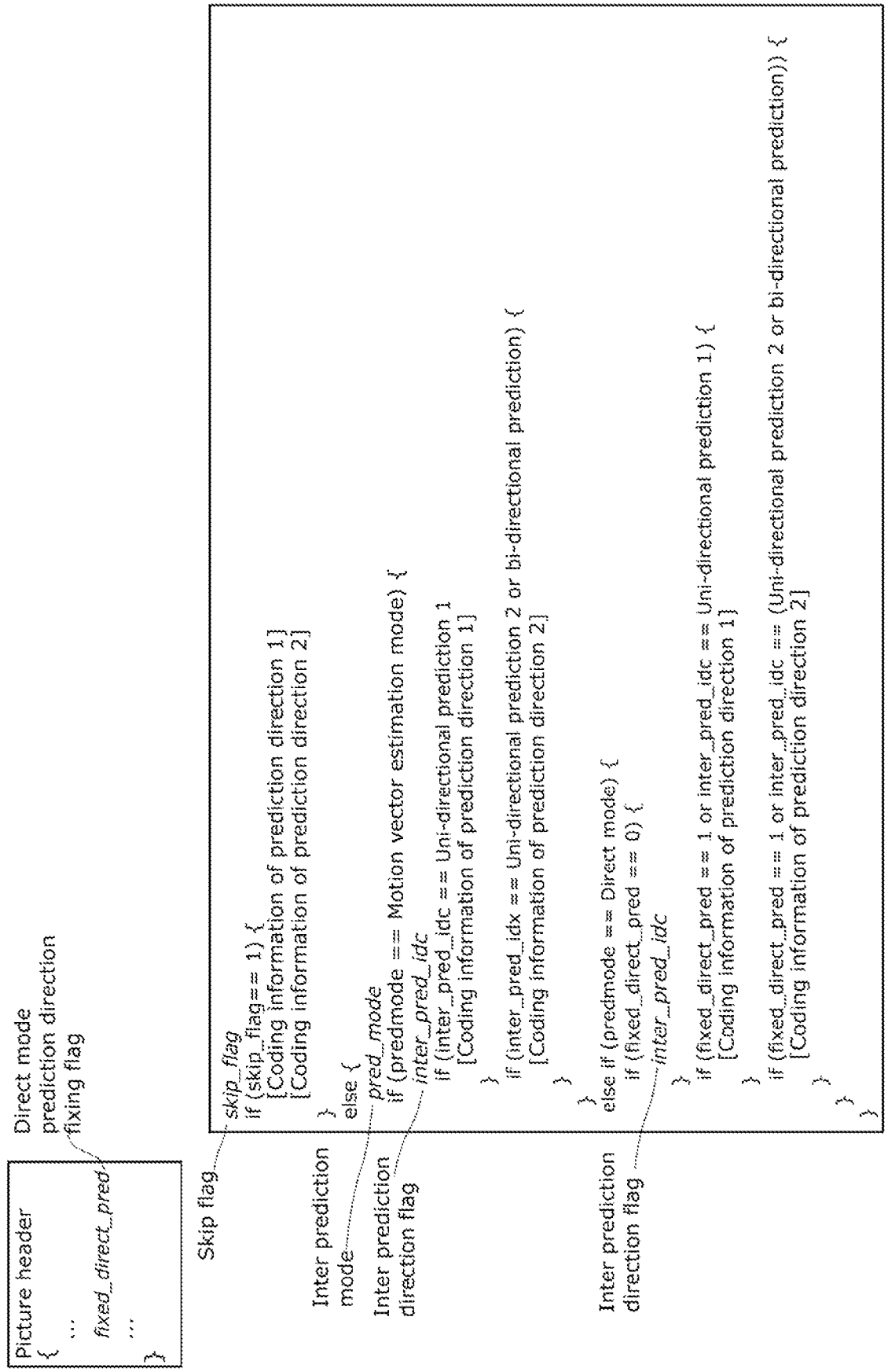
FIG. 19 is an example of a syntax of a bitstream in the moving picture decoding method according to Embodiment 5 of the present invention.

FIG. 19 is an example of a syntax of a bitstream in the moving picture decoding method according to Embodiment 5 of the present invention. In FIG. 19, skip_flag indicates a skip flag, pred_mode indicates an inter prediction mode, and inter_pred_idc indicates an inter prediction direction flag. Moreover, fixed_direct_pred added to a picture header and the like represents a direct mode prediction direction fixing flag.

As described above, since in the present embodiment, the direct mode prediction direction fixing flag explicitly given to the picture header and the like, it is possible to appropriately decode a bitstream with higher coding efficiency by flexibly switching, between each of the pictures, whether the direct mode prediction direction is fixed to bi-directional prediction.

Embodiment 6

Figure 20:
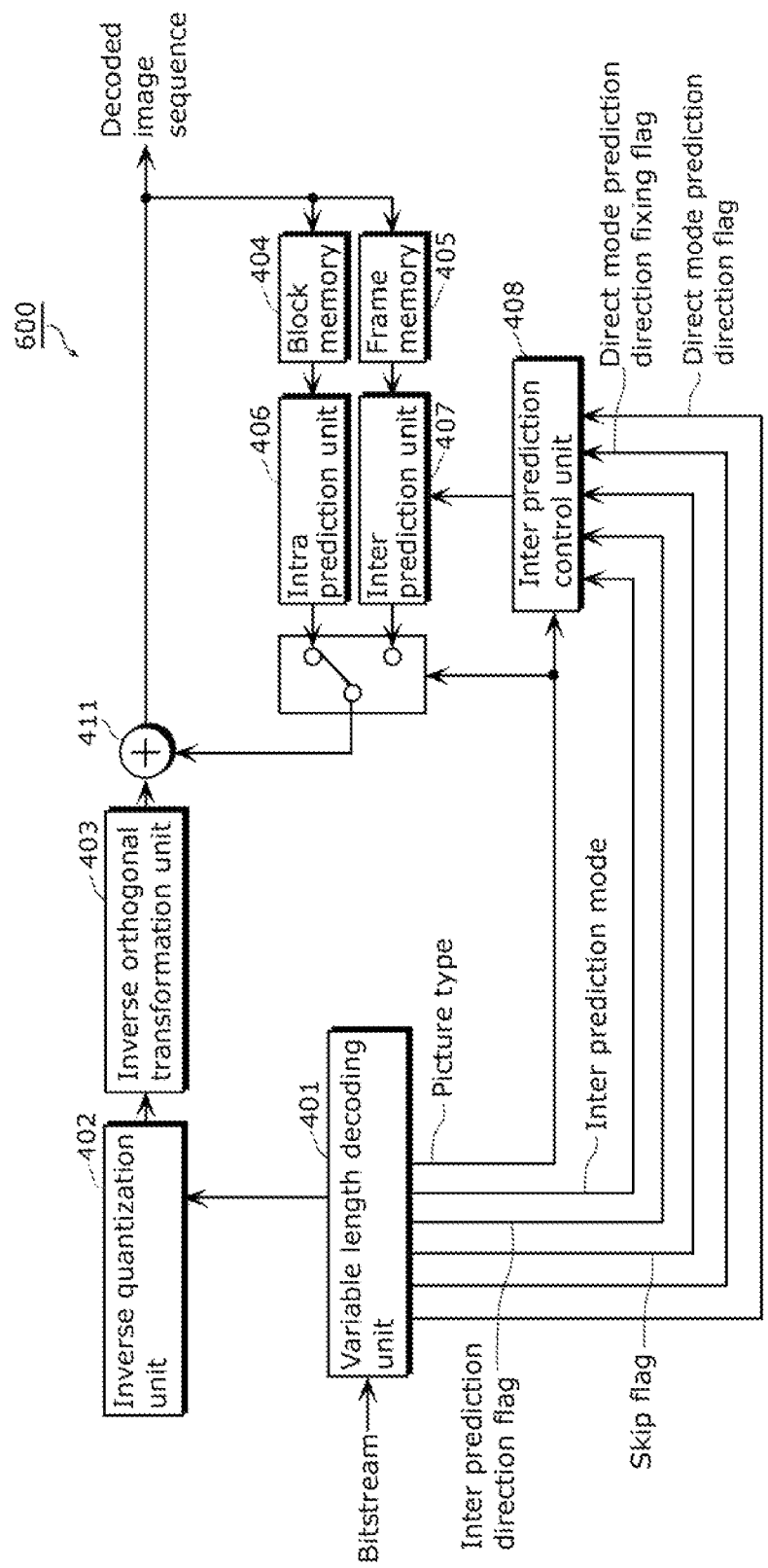
FIG. 20 is a block diagram showing a structure of a moving picture decoding apparatus using a moving picture decoding method according to Embodiment 6 of the present invention.

FIG. 20 is a block diagram showing a structure of a moving picture decoding apparatus using a moving picture decoding method according to Embodiment 6 of the present invention. The difference of a moving, picture decoding apparatus 600 according to the present embodiment from the moving picture decoding apparatus 400 according to Embodiment 4 is that the moving picture decoding apparatus 600 can decode a direct prediction direction flag and a direct mode prediction direction fixing flag added into header data (for example, a picture parameter set or a slice header in H. 264) given to a bitstream for each processing unit such as a picture.

Figure 21:
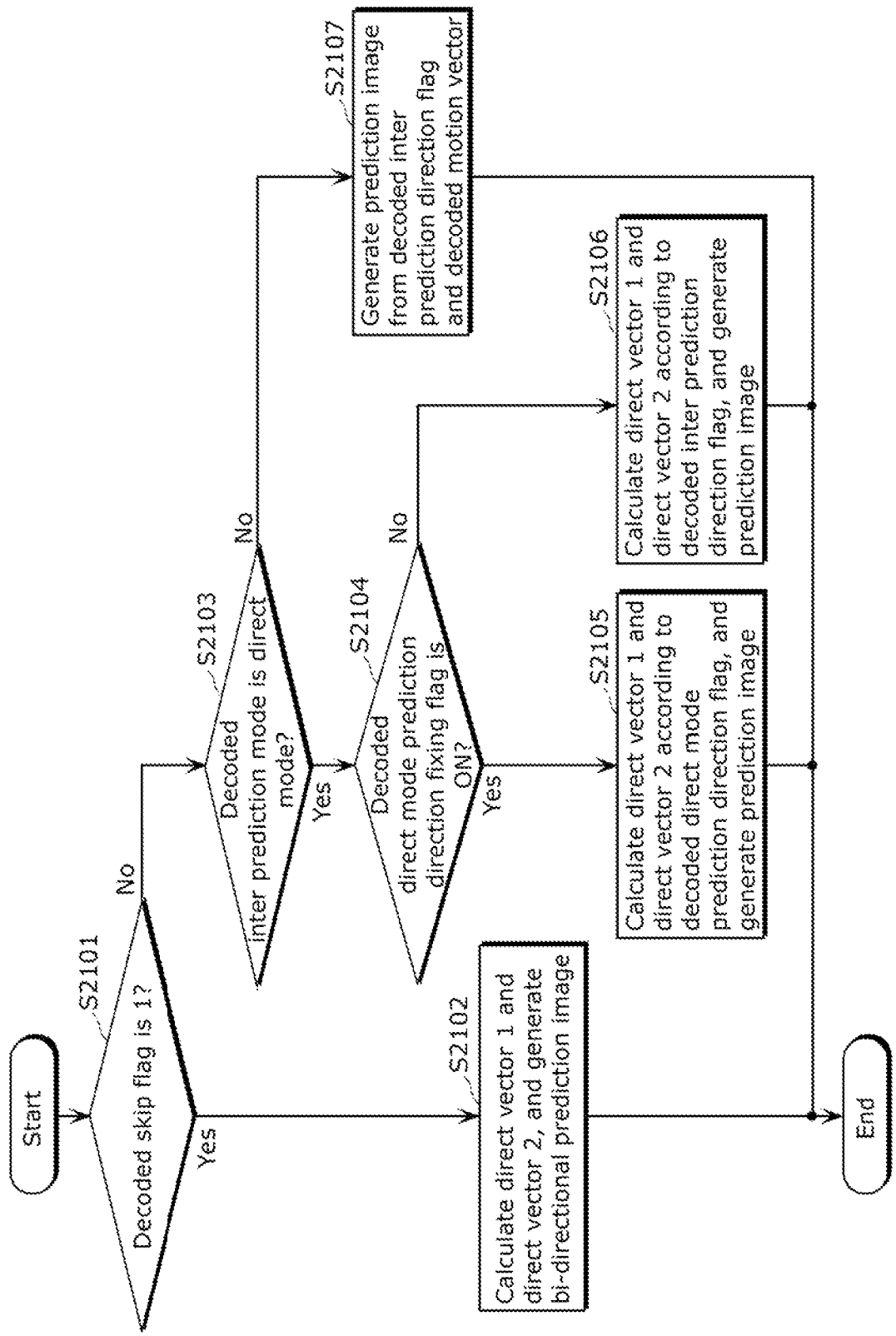
FIG. 21 is a diagram showing an outline of a process flow of the moving picture decoding method performed by the moving picture decoding apparatus according to Embodiment 6 of the present invention.

FIG. 21 is a diagram showing an outline of a process flow of the moving picture decoding method performed by the moving picture decoding apparatus according to Embodiment 6 of the present invention.

In Step S2101, it is determined whether or not the skip flag decoded from a bitstream is 1. When the skip flag is 1 (Yes in S2101), the direct vector 1 and the direct vector 2 are calculated and a bi-directional prediction image is generated in Step S2102. When the skip flag is not 1 (No in S2101), in other words, when it is not a skip mode, it is determined whether or not the decoded prediction mode is a direct mode in Step S2103.

When the prediction mode is a direct mode (Yes in S2103), it is determined whether or not the direct mode prediction direction fixing flag decoded from a bitstream is ON in Step S2104. When the direct mode prediction direction fixing flag is ON (Yes in S2104), the direct vector 1 and the direct vector 2 are calculated and a prediction image is generated according to the direct mode prediction direction prediction flag decoded from a bitstream in Step S2105. When the direct mode prediction direction fixing flag is OFF (No in S2104), the direct vector 1 and the direct vector 2 are calculated according to the decoded inter prediction direction flag and a prediction image is generated in Step 2106.

Meanwhile, when the prediction mode is not a direct mode (No in S2103), in other words, when the prediction mode is a motion vector estimation mode, a prediction image is generated using the decoded inter prediction direction flag and the decoded motion vector in Step S2107.

FIG. 22 is an example of a syntax of a bitstream in the moving picture decoding method according to Embodiment 6 of the present invention. In FIG. 22, skip flag indicates a skip flag, pred_mode indicates an inter prediction mode, and inter_pred_idc indicates an inter prediction direction flag. Moreover, fixed_direct_pred added to a picture header and the like indicates a direct mode prediction direction fixing flag, and direct_pred_idc indicates a direct prediction direction flag.

As described above, since in the present embodiment, the direct mode prediction direction fixing flag and the direct prediction direction flags are explicitly given to the picture header and the like, it is possible to appropriately decode a bitstram with higher coding efficiency by flexibly switching, between each of the pictures, whether the direct mode prediction direction is fixed to a certain prediction direction.

Embodiment 7

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image ceding apparatus using the image coding method and an image decoding apparatus using the image decoding method. Other configurations in the system can be changed as appropriate depending on the cases.

FIG. 23 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to device, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 23, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (COMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for encoding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user; and reproduce the decoded data in real time in the content providing system ex100, so that the user who does not have any particular right and equipment can implement personal broadcasting.

Figure 24:
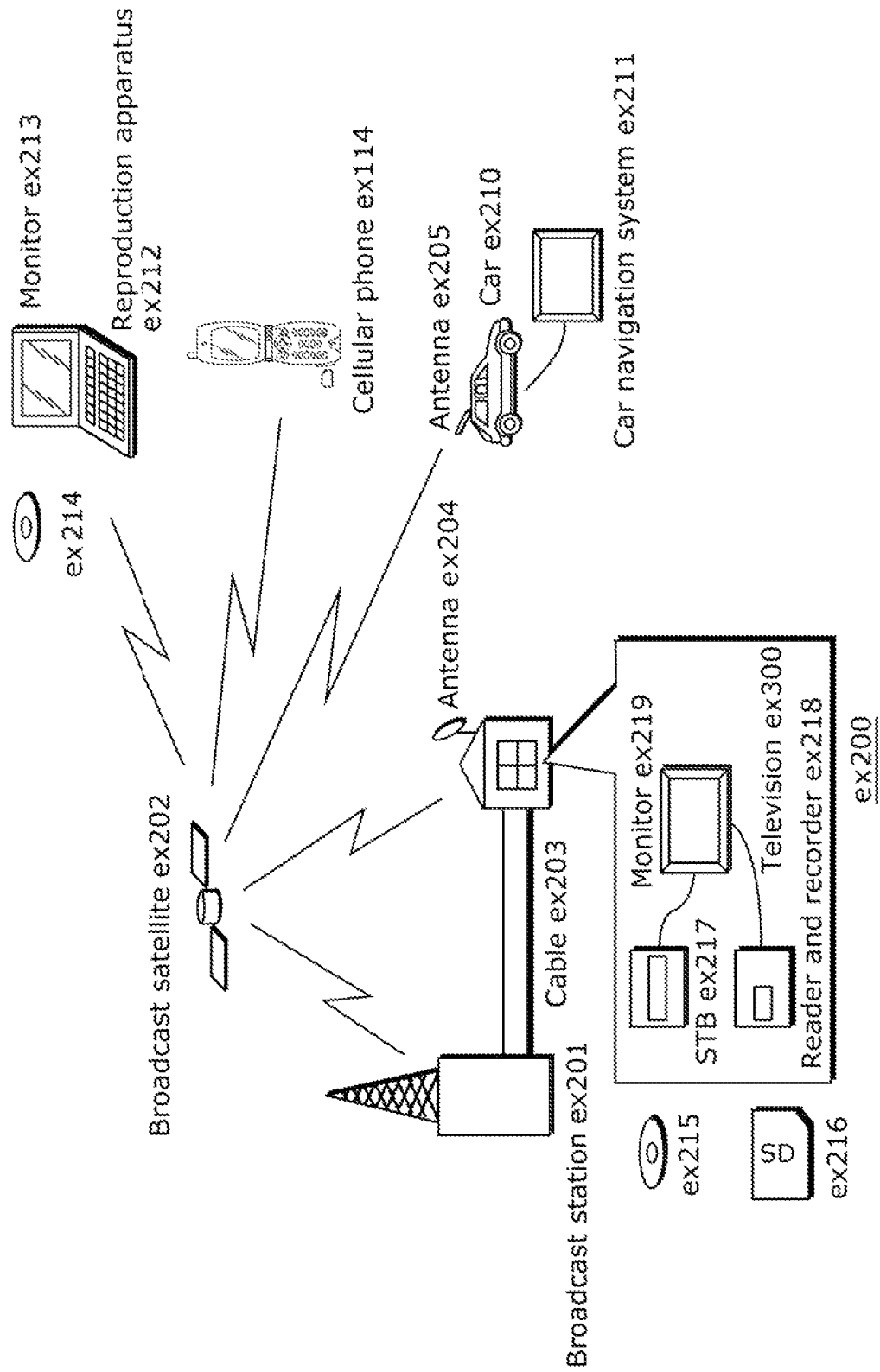
FIG. 24 illustrates an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 24. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 25:
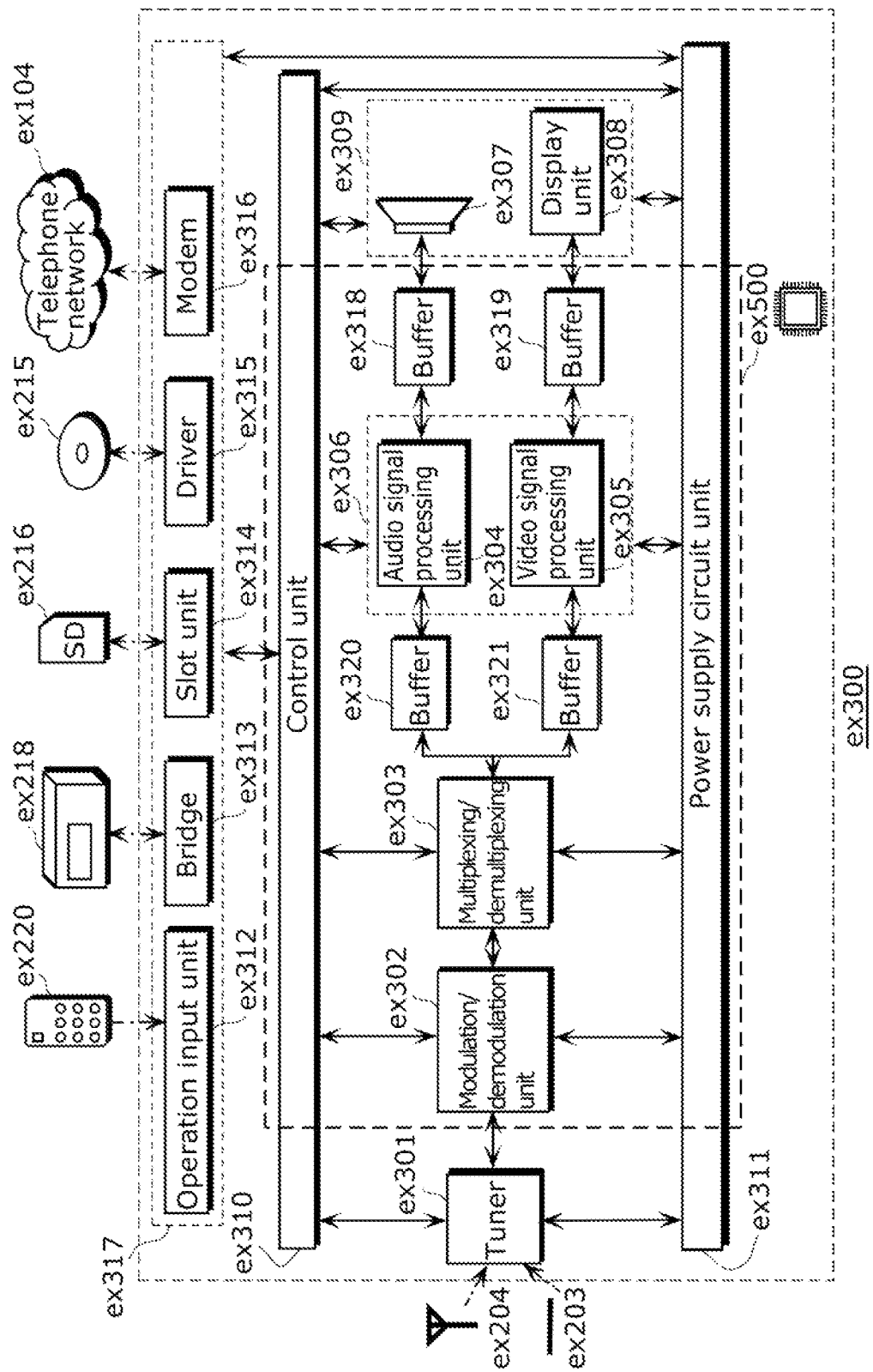
FIG. 25 is a block diagram illustrating an example of a configuration of a television.

FIG. 25 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex300 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underfloor may be avoided between the modulation/demodulation unit ex302 and the multiplexing/demultiplexing unit ex303 for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or encode the multiplexed data, and the television ex300 and the reader/recorder ex218 may share the decoding or encoding.

Figure 26:
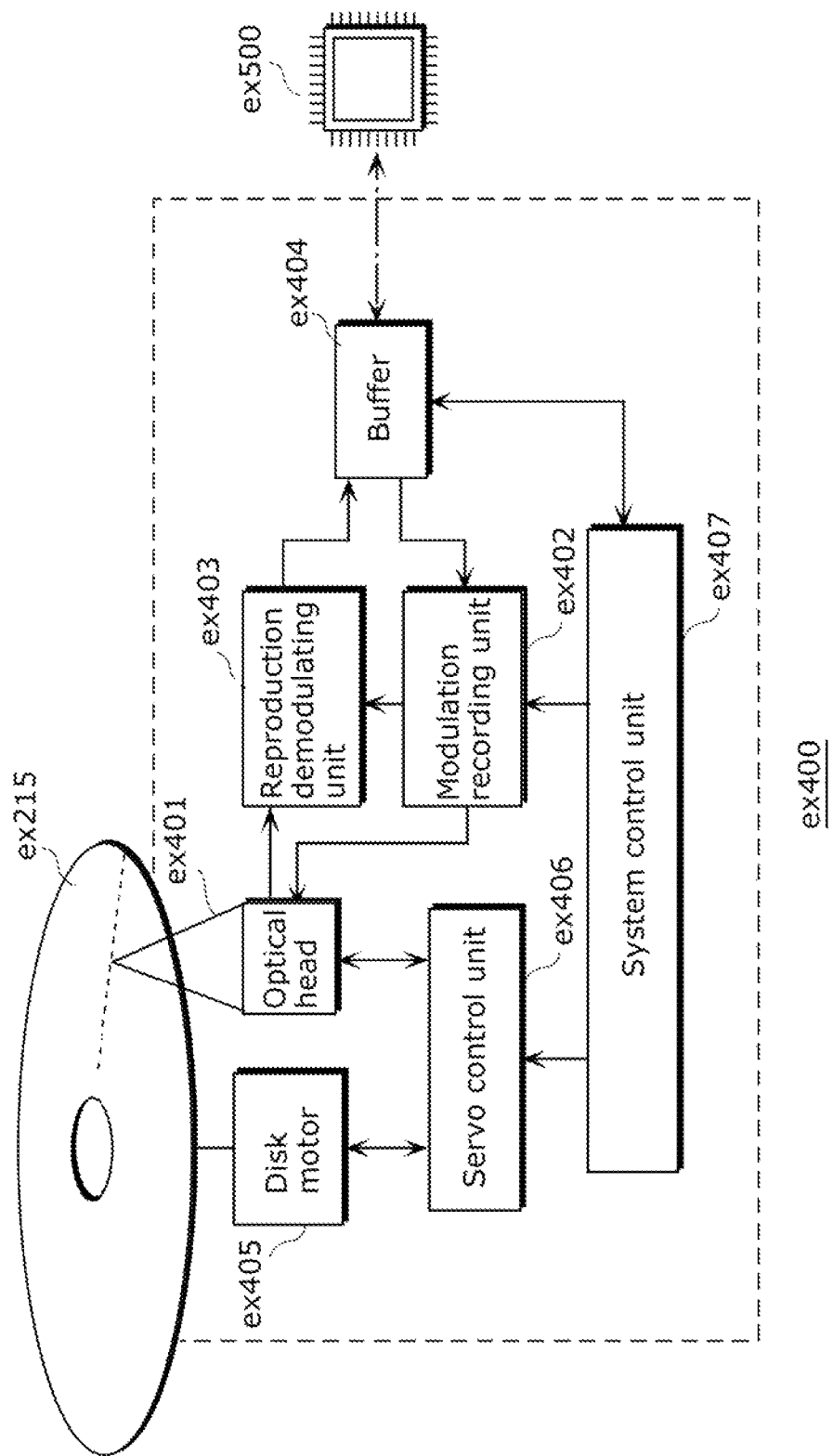
FIG. 26 is a block diagram illustrating an example of a configuration of an information reproducing/recording unit that reads and writes information from and on a recording medium that is an optical disk.

As an example, FIG. 26 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium, ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 27:
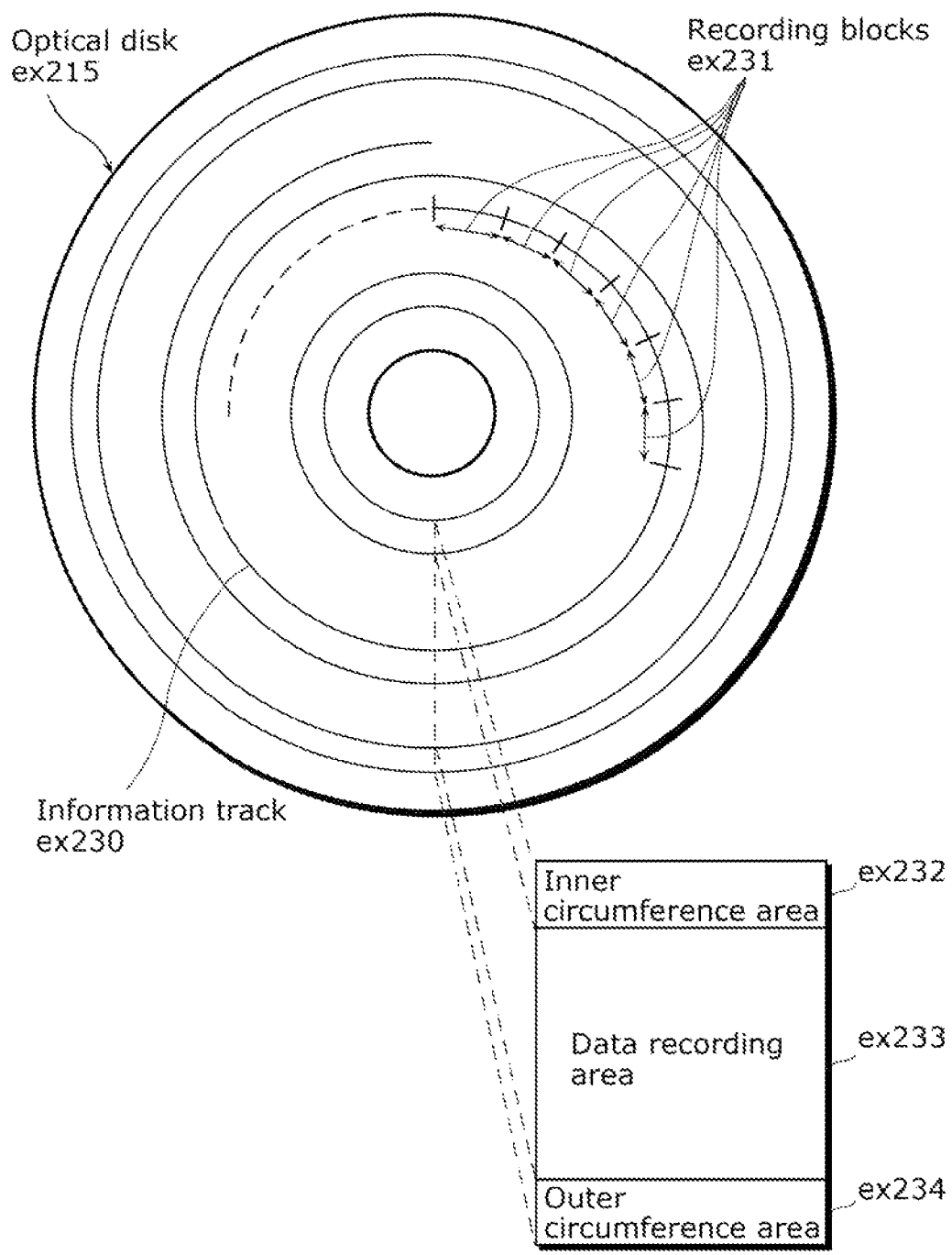
FIG. 27 shows an example of a configuration of a recording medium that is an optical disk.

FIG. 27 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 25. The same will be true for the configuration of the computer ex111, the cellular phone ex114, and others.

(a) in FIG. 28 illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, encoded or decoded data of the received video, the still pictures, e-mails, or others; and a slot unit ex364 that is an interface unit for a recording medium that stores data in the same manner as the memory unit ex367.

Next, an example of a configuration of the cellular phone ex114 will be described with reference to (b) in FIG. 28. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 8

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 29 illustrates a structure of the multiplexed data. As illustrated in FIG. 29, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

FIG. 30 schematically illustrates how data multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

FIG. 31 illustrates how a video stream is stored in a stream of PES packets in more detail. The first bar in FIG. 31 shows a video frame stream in a video stream. The second bar shows the stream of PES packets. As indicated by arrows denoted as yy1, yy2, yy3, and yy4 in FIG. 31, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 32 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 32. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

FIG. 33 illustrates the data structure of the PMT in detail, A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Each of the multiplexed data information files is management information of the multiplexed data as shown in FIG. 34. The multiplexed data information files are in one to one correspondence with the multiplexed data, and each of the files includes multiplexed data information, stream attribute information, and an entry map.

As illustrated in FIG. 34, the multiplexed data information includes a system rate, a reproduction start time, and a reproduction end time. The system rate indicates the maximum transfer rate at which a system target decoder to be described later transfers the multiplexed data to a ND filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

As shown in FIG. 35, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Furthermore, FIG. 36 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step ex S102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 9

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 37 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 10

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

In order to solve the problem, the moving picture decoding apparatus, such as the television ex300 and the LSI ex500 is configured to determine to which standard the video data conforms, and switch between the driving frequencies according to the determined standard. FIG. 38 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 37. Here, each of the decoding processing unit ex801 that executes the moving picture decoding method described in each of embodiments and the decoding processing unit ex802 that conforms to the conventional standard corresponds to the signal processing unit ex507 in FIG. 37. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 8 is probably used for identifying the video data. The identification information is not limited to the one described in Embodiment 8 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 40. The driving frequency can be selected by storing the look-up table in the buffer ex508 and in an internal memory of an LSI, and with reference to the look-up table by the CPU ex502.

FIG. 39 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 11

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in (a) in FIG. 41 shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing which is unique to an aspect of the present invention and does not conform to MPEG-4 AVC. Since the aspect of the present invention is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in (b) in FIG. 41 shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

An image coding method and an image decoding method according to the present invention can be applied to, for example, a television receiver, a digital video recorder, a car navigation system, a cellular phone, a digital camera, a digital video camera, or the like.

REFERENCE SIGNS LIST

100, 200, 300 Moving picture coding apparatus
101 Subtracting unit
102 Orthogonal transformation unit
103 Quantization unit
104, 402 Inverse quantization unit
105, 403 Inverse orthogonal transformation unit
106, 411 Adding unit
107, 404 Block memory
108, 405 Frame memory
109, 406 Intra prediction unit
110, 407 Inter prediction unit
111, 408 Inter prediction control unit
112 Picture type determination unit
113, 409 Reference picture list management unit
114, 214, 314, 410 Direct mode prediction direction determination unit
115 Variable length coding unit
400, 500, 600 Moving picture decoding apparatus
401 Variable length decoding unit

The invention claimed is:
1. An image coding method for coding, using inter prediction, a current block included in a current picture, the image coding method comprising:
adding, into header data, a prediction direction fixing flag indicating whether a prediction direction for coding all blocks using inter prediction in the entire current picture in a direct mode is fixed to one of a uni-directional prediction in which only one reference picture is referred to and a bi-directional prediction in which at least two reference pictures are referred to, the direct mode being a mode in which a motion vector of the current block is predicted from a motion vector used for a coded neighboring block; and
coding the entire current picture based on the prediction direction fixing flag,
wherein, in the coding of the current block,
whether to use the direct mode for the current block and whether the prediction direction fixing flag of the current picture is ON are determined,
after determining that the direct mode is to be used for the current block and the prediction direction fixing flag of the current picture is ON, the current block is coded using the bi-directional prediction, and
after determining that the direct mode is to be used for the current block and the prediction direction fixing flag of the current picture is OFF,
a selection is made between one of the bi-directional prediction and the uni-directional prediction, the current block is coded using the selected one of the bi-directional prediction and the uni-directional, and a prediction direction flag indicating the selected one of the bi-directional prediction and the uni-directional prediction is added into a bitstream.

2. An image coding method for coding, using inter prediction, a current block included in a current picture, the image coding method comprising:

adding, into header data, (i) a prediction direction fixing flag indicating whether a prediction direction for coding all blocks using inter prediction in the entire current picture in a direct mode is fixed to one of a uni-directional prediction in which only one reference picture is referred to and a bi-directional prediction in which at least two reference pictures are referred to, and (ii) a first prediction direction flag indicating one of the uni-directional prediction and the bi-directional prediction when the prediction direction fixing flag is ON, the direct mode being a mode in which a motion vector of the current block is predicted from a motion vector used for a coded neighboring block; and coding the entire current picture based on the prediction direction fixing flag and the first prediction direction flag, wherein, in the coding of the current block, whether to use the direct mode for the current block and whether the prediction direction fixing flag of the current picture is ON are determined, after determining that the direct mode is to be used for the current block and the prediction direction fixing flag of the current picture is ON the current block is coded using the one of the uni-directional prediction and the bi-directional prediction identified by the first prediction direction flag, and after determining that the direct mode is to be used for the current block and the prediction direction fixing flag of the current picture is OFF, a selection is made between one of the bi-directional prediction and the uni-directional prediction the current block is coded using the selected one of the bi-directional prediction and the uni-directional prediction, and a second prediction direction flag indicating the selected one of the bi-directional prediction and the uni-directional prediction is added into a bitstream.

3. An image decoding method for decoding, using inter prediction, a current block in a current picture, the image decoding method comprising:

parsing, from a bitstream, a prediction direction fixing flag indicating whether a prediction direction for decoding all blocks using inter prediction in the entire current picture in a direct mode is fixed to one of a uni-directional prediction in which only one reference picture is referred to and a bi-directional prediction in which at least two reference pictures are referred to, the direct mode being a mode in which a motion vector of the current block is predicted from a motion vector used for a decoded neighboring block; and decoding the entire current picture based on the prediction direction fixing flag, wherein, in the decoding of the current block, whether to use the direct mode for the current block and whether the prediction direction fixing flag of the current picture is ON are predetermined, after determining that the direct mode is to be used for the current block and the prediction direction fixing flag of the current picture is ON, the current block is decoded using the bi-directional prediction, and after determining that the direct mode is to be used for the current block and the prediction direction fixing flag of the current picture is OFF, a prediction direction flag indicating one of the bi-directional prediction and the uni-directional prediction is parsed from the bitstream, and the current block is decoded using the one of the bi-directional prediction and the uni-directional prediction indicated by the parsed prediction direction flag.

4. An image decoding method for decoding, using inter prediction, a current block included in a current picture, the image decoding method comprising:

parsing, from a bitstream, (i) a prediction direction fixing flag indicating whether a prediction direction for decoding all blocks using inter prediction in the entire current picture in a direct mode is fixed to one of a uni-directional prediction in which only one reference picture is referred to and a bi-directional prediction in which at least two reference pictures are referred to, and (ii) a first prediction direction flag indicating one of the uni-directional prediction and the bi-directional prediction when the prediction direction fixing flag is ON, the direct mode being a mode in which a motion vector of the current block is predicted from a motion vector used for a decoded neighboring block; and decoding the entire current picture based on the prediction direction fixing flag and the first prediction direction flag, wherein, in the decoding of the current block, whether to use the direct mode for the current block and whether the prediction direction fixing flag of the current picture is ON are determined, after determining that the direct mode is to be used for the current block and the prediction direction fixing flag of the current picture is ON, the current block is decoded using the one of the uni-directional prediction and the bi-directional prediction identified by the first prediction direction flag, and after determining that the direct mode is to be used for the current block and the prediction direction fixing flag of the current picture is OFF, a second prediction direction flag indicating one of the bi-direction prediction and the uni-directional prediction is parsed from the bitstream, and the current block is decoded using the one of the bi-directional prediction and the uni-directional prediction indicated by the parsed second prediction direction flag.

5. The image coding method according to claim 1, wherein when the prediction direction fixing flag is ON, the uni-direction prediction and P-pictures are excluded from the coding.

* * * * *